(12) United States Patent
Takahashi

(10) Patent No.: US 7,791,754 B2
(45) Date of Patent: Sep. 7, 2010

(54) OPERATION REQUEST ACCEPTING APPARATUS, COMPUTER-READABLE PROGRAM, COMPUTER-READABLE STORAGE MEDIUM, CONTROL METHOD FOR OPERATION REQUEST ACCEPTING APPARATUS, COMMUNICATION SYSTEM AND OPERATING METHOD FOR COMMUNICATION SYSTEM

(75) Inventor: Shintaroh Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1086 days.

(21) Appl. No.: 11/425,305

(22) Filed: Jun. 20, 2006

(65) Prior Publication Data

US 2006/0290726 A1   Dec. 28, 2006

(30) Foreign Application Priority Data

Jun. 28, 2005   (JP) .............................. 2005-187858

(51) Int. Cl.
*G06F 3/12* (2006.01)
(52) U.S. Cl. .................. 358/1.15; 358/1.13; 358/1.16; 358/403; 358/400; 358/1.9; 379/100.01; 709/229; 709/228; 709/246; 709/202; 709/245
(58) Field of Classification Search ................ 358/1.15, 358/1.13, 1.9, 1.14, 400, 403; 379/100.01; 709/229, 228, 246, 202, 245
See application file for complete search history.

(56) References Cited

U.S. PATENT DOCUMENTS

| | | | | |
|---|---|---|---|---|
| 5,276,802 | A * | 1/1994 | Yamaguchi et al. | 385/115 |
| 7,207,734 | B2 * | 4/2007 | Yamada et al. | 400/63 |
| 7,382,477 | B2 * | 6/2008 | Wanda | 358/1.15 |
| 7,409,477 | B2 * | 8/2008 | Wyatt et al. | 710/62 |
| 7,443,527 | B1 * | 10/2008 | Shigeeda | 358/1.15 |
| 2003/0063305 | A1 * | 4/2003 | McIntyre | 358/1.13 |
| 2004/0264427 | A1 | 12/2004 | Jaakkola et al. | |
| 2005/0069292 | A1 * | 3/2005 | Yokota et al. | 386/95 |
| 2005/0128514 | A1 * | 6/2005 | Wanda et al. | 358/1.15 |
| 2007/0108272 | A1 * | 5/2007 | Kamata | 235/382 |
| 2007/0156925 | A1 * | 7/2007 | Shigeta et al. | 709/246 |

FOREIGN PATENT DOCUMENTS

| | | |
|---|---|---|
| EP | 0 750 250 A1 | 12/1996 |
| EP | 1 560 109 A1 | 8/2005 |
| JP | 2005-94301 | 4/2005 |
| WO | WO 2004/042550 A1 | 5/2004 |
| WO | WO 2004/058403 A2 | 7/2004 |

* cited by examiner

*Primary Examiner*—Negussie Worku
(74) *Attorney, Agent, or Firm*—Oblon, Spivak, McClelland, Maier & Neustadt, L.L.P.

(57) ABSTRACT

An operation request accepting apparatus is provided with a reading part to read from a detachable recording medium setting information that is used when a remote end sends an operation request with respect to the operation request accepting apparatus, and an accepting part having an essential setting that does not accept the operation request from the remote end if the setting information is non-readable from the recording medium.

20 Claims, 17 Drawing Sheets

FIG.10

The settings were read from the SD memory card
and the following changes were made.

Before the Change
    IP Address         192.168.1.8
    Sub Net Mask      255.255.255.0
    Default Gateway   192.168.1.1

After the Change
    IP Address         192.168.3.15
    Sub Net Mask      255.255.255.0
    Default Gateway   192.168.3.1

OPERATION REQUEST ACCEPTING APPARATUS, COMPUTER-READABLE PROGRAM, COMPUTER-READABLE STORAGE MEDIUM, CONTROL METHOD FOR OPERATION REQUEST ACCEPTING APPARATUS, COMMUNICATION SYSTEM AND OPERATING METHOD FOR COMMUNICATION SYSTEM

BACKGROUND OF THE INVENTION

1. Field of the Invention

The present invention generally relates to operation request accepting apparatuses, computer-readable programs, computer-readable storage media, control methods for operation request accepting apparatus, communication systems and operating methods for communication system, and more particularly to an operation request accepting apparatus for accepting an operation request from a remote end (or other party), a computer-readable program for causing a computer to control such an operation request accepting apparatus, a computer-readable storage medium which stores such a computer-readable program, a control method for controlling such an operation request accepting apparatus, a communication system including such an operation request accepting apparatus and a communication apparatus at the remote end, and an operating method for such a communication system.

2. Description of the Related Art

Conventionally, an operation request accepting apparatus that accepts an operation request from a remote end is used in various fields. One example of such an operation request accepting apparatus is a printer which accepts a print request from a host computer that is connected to the printer via a network, and carries out a print operation in response to the print request.

Among such printers, a printer proposed in a Japanese Laid-Open Patent Application No. 2005-94301 reads data from a Secure Digital (SD) memory card when the printer is started.

There are various usages for this printer. For example, in hospitals, newspaper offices and gift shops, a large number of small-scale or compact printers are used to carry out a large amount of printing work. On the other hand, since in general the printer failure is more likely to occur as the amount of printing work increases, the printer failure frequently occurs in the above described environment where the large number of printers are used to carry out the large amount of printing work. When the printer failure occurs, a service engineer of the printer manufacturer is called to fix the printer failure, and it may take several hours for the printer failure to be fixed and the printer to become usable again.

However, depending on the kind of work, the work may be greatly affected when the printer becomes non-usable for a long time due to the printer failure. For example, if the printer for printing prescriptions in a hospital becomes non-usable for a long time due to the printer failure, the patients cannot receive the prescriptions and the hospital work may be greatly confused. In addition, if the printer for printing distributing articles in a newspaper office becomes non-usable for a long time due to the printer failure, it may become impossible to set the articles in the newspaper by the deadline.

In order to cope with such problems, one of the following measures is conventionally taken.

According to the first measure, spare printers are kept in a storage so as to enable quick restoration of the system. The number of spare printers kept in the storage is a predetermined proportion with respect to the number of printers that are normally used in the system. For example, 10 spare printers may be kept in the storage when 100 printers are normally used in the system.

According to the second measure, the output destination is changed from the printer in which the printer failure occurred to another printer that is already connected to the same network. This other printer may be an auxiliary printer which is connected to the network for use when the printer failure occurs but is normally not used or, a printer which is connected to the network and is used for other work. The latter printer may be temporarily used for the work originally intended for the printer in which the printer failure occurred.

However, according to the first measure, it is necessary to replace the original printer in which the printer failure occurred by the spare printer. In addition, in order to operate the spare printer in the same manner as the replaced original printer, it is necessary to make the settings for the communication and printing in the spare printer the same as the settings of the replaced original printer. In most cases, the operations of replacing the original printer by the spare printer and making the settings in the spare printer are carried out by the operator who is actually using the printer to do the work.

However, in many cases, the operator is unfamiliar with the settings of the equipments including the printer. For this reason, the operator must make the settings in the spare printer while reading a manual, and the work may be affected if it takes a long time for the operator to make the required settings. In addition, if the operator makes an erroneous setting in the spare printer, it may become impossible to print on the spare printer, and there is a possibility of affecting the other network equipments.

The replaced original printer in which the printer failure occurred is fixed at another timing, and is usually used as a spare printer or, put back to its original position to replace the spare printer. For this reason, the spare printers that are kept in the storage may have the settings that were previously set. In this case, if the spare printer is connected as it is to the network without changing the setting of the Internet Protocol (IP) address, the address of this spare printer may become identical to that of another network equipment and affect the communication via the network.

Furthermore, even if were possible to make the network communication, the printing may not be carried out correctly if the setting of the emulation language and the like in the spare printer is different from that of the replaced original printer.

In order to eliminate these problems, there is a known tool for automatically making the setting of the emulation language and the like via the network. However, this tool cannot be utilized unless the setting related to the network communication has been made, and for this reason, this tool is insufficient as a cure for these problems.

On the other hand, according to the second measure, if one auxiliary printer is prepared for each printer that is normally used, it becomes necessary to set up the auxiliary printers at a large number of locations and the cost of the system increases due to the cost of the auxiliary printers which must be provided additionally. In addition, if the printer that is normally used for the other work is temporarily used for the work originally intended for the printer in which the printer failure occurred, the print-outs of the printer become a mixture of two different works, and confusion may be generated in the work unless the originally intended work of this printer is stopped, for example.

Moreover, when changing the output destination from the printer in which the printer failure occurred to another printer that is already connected to the same network, it is necessary to also change the settings of the application in the host computer. In most cases, the change in the settings of the application in the host computer is also made by the operator who is actually using the printer to do the work. However, in many cases, the operator is unfamiliar with the settings of the application in the host computer, and if the operator makes an erroneous setting of the application in the host computer, such as setting an erroneous output destination, the intended work may be stopped for a long time.

The problems described above are not limited to printers, and are similarly generated in operation request accepting apparatuses which accept an operation request from a remote end and are used under various and severe conditions.

SUMMARY OF THE INVENTION

Accordingly, it is a general object of the present invention to provide a novel and useful operation request accepting apparatus, computer-readable program, computer-readable storage medium, control method for operation request accepting apparatus, communication system, and operating method for communication system, in which the problems described above are suppressed.

Another and more specific object of the present invention is to provide an operation request accepting apparatus, a computer-readable program, a computer-readable storage medium, a control method for operation request accepting apparatus, a communication system, and an operating method for communication system, which can build, at a low cost, an environment that enables a substitute equipment to quickly continue the work even when a failure is generated in an operation request accepting apparatus which accepts an operation request from a remote end.

Still another object of the present invention is to provide an operation request accepting apparatus comprising a reading part configured to read, from a detachable recording medium, setting information that is used when a remote end sends an operation request with respect to the operation request accepting apparatus; and an accepting part having an essential setting that does not accept the operation request from the remote end if the setting information is non-readable from the recording medium. According to the operation request accepting apparatus of the present invention, it is possible to build, at a low cost, an environment that enables a substitute equipment to quickly continue the work even when a failure is generated in the operation request accepting apparatus which accepts the operation request from the remote end.

A further object of the present invention is to provide a computer-readable program which, when executed by a computer, causes the computer to perform a process of accepting an operation request from a remote end, comprising a reading procedure causing the computer to read, from a recording medium that is detachably coupled to the computer, setting information that is used when the remote end sends the operation request with respect to the computer; and an accepting procedure causing the computer to make an essential setting that does not accept the operation request from the remote end if the setting information is non-readable from the recording medium. According to the computer-readable program of the present invention, it is possible to build, at a low cost, an environment that enables a substitute equipment to quickly continue the work even when a failure is generated in the computer which accepts the operation request from the remote end.

Another object of the present invention is to provide a computer-readable storage medium which stores a program for causing the computer to perform a process of accepting an operation request from a remote end, the program comprising a reading procedure causing the computer to read, from a recording medium that is detachably coupled to the computer, setting information that is used when the remote end sends the operation request with respect to the computer; and an accepting procedure causing the computer to make an essential setting that does not accept the operation request from the remote end if the setting information is non-readable from the recording medium. According to the computer-readable storage medium of the present invention, it is possible to build, at a low cost, an environment that enables a substitute equipment to quickly continue the work even when a failure is generated in the computer which accepts the operation request from the remote end.

Still another object of the present invention is to provide a control method for an operation request accepting apparatus which accepts an operation request from a remote end, comprising the steps of reading, from a detachable recording medium, setting information that is used when the remote end sends the operation request with respect to the operation request accepting apparatus; and making an essential setting that does not accept the operation request from the remote end if the setting information is non-readable from the recording medium. According to the control method of the present invention, it is possible to build, at a low cost, an environment that enables a substitute equipment to quickly continue the work even when a failure is generated in the operation request accepting apparatus which accepts the operation request from the remote end.

A further object of the present invention is to provide a communication system comprising an operation request accepting apparatus; and a communication apparatus configured to send an operation request with respect to the operation request accepting apparatus, wherein the operation request accepting apparatus comprises a reading part configured to read, from a detachable recording medium, setting information that is used when the communication apparatus sends the operation request with respect to the operation request accepting apparatus; and an accepting part having an essential setting that does not accept the operation request from the communication apparatus if the setting information is non-readable from the recording medium. According to the communication system of the present invention, it is possible to build, at a low cost, an environment that enables a substitute equipment to quickly continue the work even when a failure is generated in the operation request accepting apparatus which accepts the operation request from the remote end such as the communication apparatus.

Another object of the present invention is to provide an operating method for a communication system having an operation request accepting apparatus and a communication apparatus configured to send an operation request with respect to the operation request accepting apparatus, wherein the operation request accepting apparatus comprises a reading part configured to read, from a detachable recording medium, setting information that is used when the communication apparatus sends the operation request with respect to the operation request accepting apparatus, and an accepting part having an essential setting that does not accept the operation request from the communication apparatus if the setting information is non-readable from the recording medium, the operating method comprising the steps of making the essential setting in the operation request accepting apparatus that is to be set to a state communicatable with the communication apparatus; coupling to the operation request accepting apparatus the detachable recording medium that is recorded with the setting information; preparing a substitute apparatus having comparable functions as the operation request accepting apparatus and having the essential setting; and replacing the operation request accepting apparatus by the substitute apparatus if a failure occurs in the operation request accepting apparatus, coupling the recording medium to the substitute apparatus by removing the recording medium from the operation request accepting apparatus, and setting the substitute apparatus to a state communicatable with the communication apparatus. According to the operating method of the present invention, it is possible to build, at a low cost, an environment that enables a substitute equipment to quickly continue the work even when a failure is generated in the operation request accepting apparatus which accepts the operation request from the remote end such as the communication apparatus.

Other objects and further features of the present invention will be apparent from the following detailed description when read in conjunction with the accompanying drawings.

BRIEF DESCRIPTION OF THE DRAWINGS

FIG. 10 is a diagram showing printing contents for notifying a user when setting information of an internal storage part is changed during the process shown in FIG. 9;

DESCRIPTION OF THE PREFERRED EMBODIMENTS

Figure 1:
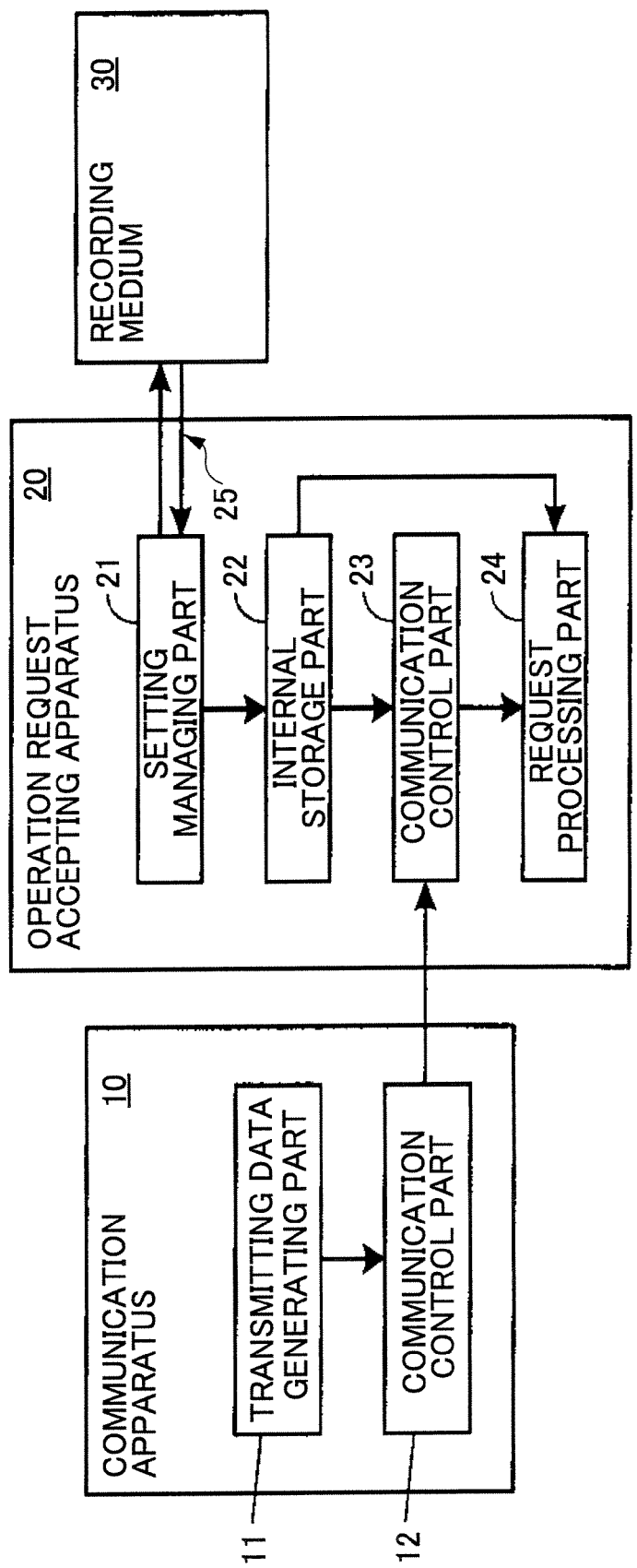
FIG. 1 is a functional block diagram showing a structure of a first embodiment of a communication system according to the present invention.

A description will be given of embodiments of the operation request accepting apparatus, computer-readable program, computer-readable storage medium, control method for operation request accepting apparatus, communication system and operating method for communication system, by referring to the drawings.

First Embodiment

FIGS. 1 to 3B

A first embodiment of the present invention will be described with reference to FIGS. 1 to 3.

FIG. 1 is a functional block diagram showing a structure of a first embodiment of a communication system according to the present invention.

The communication system shown in FIG. 1 includes a communication apparatus 10 and an operation request accepting apparatus 20 that are communicatably connected via a communication path which may be a network such as a Local Area Network (LAN). The communication path connecting the communication apparatus 10 and the operation request accepting apparatus 20 need only enable at least transmission of data from the communication apparatus 10 to the operation request accepting apparatus 20, and does not necessarily need to enable two-way data communication.

The communication apparatus 10 has a transmitting data generating part 11 and a communication control part 12. The communication apparatus 10 becomes a remote end (or other party) with respect to the operation request accepting apparatus 20, and has the function of transmitting an operation request that requests a certain operation with respect to the operation request accepting apparatus 20. The transmitting data generating part 11 has the function of generating the operation request, and the communication control part 12 has the function of transmitting the operation request with respect to the operation request accepting apparatus 20.

On the other hand, the operation request accepting apparatus 20 has a setting managing part 21, an internal storage part 22, a communication control part 23 and a request processing part 24. The operation request accepting apparatus 20 has the functions of accepting the operation request from the communication apparatus 10 and carrying out an operation in accordance with the operation request if necessary. The operation request accepting apparatus 20 also has an interface 25 to which a recording medium 30 is detachably connectable. The recording medium 30 may be formed by any of various non-volatile recording media such as a Secure Digital (SD) memory card, a Compact Flash (registered trademark), a Universal Serial Bus (USB) memory and a USB hard disk.

The operation request accepting apparatus 20 is not limited to a particular type of apparatus as long as the operation request accepting apparatus 20 has the functions of accepting the operation request from the communication apparatus 10 and carrying out an operation in accordance with the operation request if necessary. For example, the operation request accepting apparatus 20 may be an apparatus which treats image data, such as a printer, scanner, a facsimile apparatus and a composite apparatus (or MFP: Multi-Function Peripheral). In addition, the operation request accepting apparatus 20 may be a sensor or a monitoring camera that output a detection result to the outside. The operation request accepting apparatus 20 may be a digital or electronic sign or display for displaying images or messages in response to an external instruction. Moreover, the operation request accepting apparatus 20 may be a light or patrol lamp that is turned ON in response to an external instruction. It is desirable, but not necessary, that the operation request accepting apparatus 20 is a kind of apparatus that is simultaneously operated in large numbers and requires quick restoration if a failure is generated therein.

The setting managing part 21 has the function of reading the setting information of various items from the recording medium 30 that is connected to the operation request accepting apparatus 20 via the interface 25, and storing the setting information in the internal storage part 22. The setting managing part 21 may also have the function of writing the setting information with respect to the recording medium 30.

The internal storage part 22 forms a storage means for storing the setting information that is referred to when the operation request accepting apparatus 20 operates. The internal storage part 22 stores at least the setting information that indicates whether or not to accept the operation request from an external apparatus such as the communication apparatus 10 when the necessary setting information cannot be read from the recording medium 30, that is, whether or not to make the recording medium 30 non-essential.

The communication control part 23 has the function of communicating with the communication apparatus 10, receiving the operation request from the communication apparatus 10, and accepting and supplying the operation request to the request processing part 24. The request processing part 24 has the function of carrying processes and operations depending on the contents of the accepted operation request. Examples of the operations carried out by the request processing part 24 include printing, reading and second of images, and editing of data. However, the operation carried out by the request processing part 24 may simply transfer the accepted operation request to another apparatus.

The operations of the communication control part 23 and the request processing part 24 are carried out according to the setting information stored in the internal storage part 22. However, the setting managing part 21 may supply the setting information read from the recording medium 30 directly to the communication control part 23 or the like.

In the case where the setting in the internal storage part 22 makes the recording medium 30 essential (or not non-essential), the communication control part 23 does not accept the operation request from the external apparatus. Such a case occurs when the recording medium 30 is not connected to the interface 25 or, the necessary setting information is not recorded in the recording medium 30 or, a failure or the like exists in the recording medium 30, and the necessary setting information, such as the IP address of the operation request accepting apparatus 20 used by the remote end when transmitting the operation request to the operation request accepting apparatus 20, cannot be read from the recording medium 30.

In this communication system, the operation request may be created as a request for a process with respect to a method of an application program that is implemented at a remote end, by the Remote Procedure Call (RPC), for example. In this case, an operation response, which is a result of the requested process, can be acquired from the remote end to which the operation request is transmitted. The Simple Object Access Protocol (SOAP) may be employed as a technique for realizing the RPC, and in this case, the operation request and the operation response may be written as a SOAP message, including the argument and the return value of the RPC. The communication protocol employed to actually transfer the operation request and the operation response may be appropriately selected depending on the system structure of the communication system. For example, it is possible to employ the HyperText Transfer Protocol (HTTP) or the Simple Mail Transfer Protocol (SMTP) for this communication protocol.

The communication protocol employed to actually transfer the operation request and the operation response does not necessarily have to enable a two-way communication. In a case where the operation request accepting apparatus 20 receives some kind of data, and the operation request accepting apparatus 20 is provided with the function of carrying out some kind of operation according to the received data, the "data" may correspond to the operation request. For example, in a case where the operation request accepting apparatus 20 is a printer, the above "data" may be data written in a printer language. Hence, in such a case, it is unnecessary for the "data" to have a meaning to apparatuses other than the operation request accepting apparatus 20 which accepts the operation request.

Figure 2:
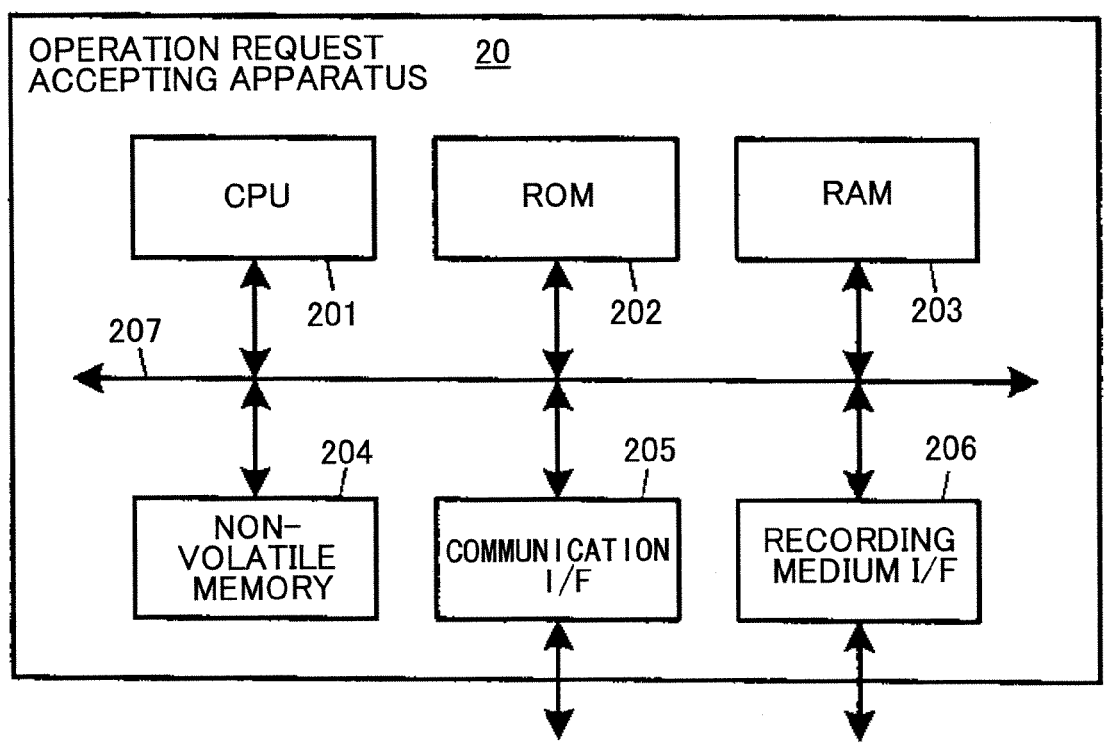
FIG. 2 is a system block diagram showing a hardware structure of an operation request accepting apparatus shown in FIG. 1.

FIG. 2 is a system block diagram showing a hardware structure of the operation request accepting apparatus 20 shown in FIG. 1.

As shown in FIG. 2, the operation request accepting apparatus 20 has a CPU 201, a ROM 202, a RAM 203, a non-volatile memory 204, a communication interface (I/F) 205 and a recording medium interface (I/F) 206 that are mutually connected via a system bus 207.

The CPU 201 forms a control part or means for generally controlling the entire operation request accepting apparatus 20. The CPU 201 functions as various parts or means, such as a reading part or means, by executing various programs stored in the ROM 202 and/or the non-volatile memory 204, to realize various functions related to the characterizing features of this embodiment described hereunder.

The ROM 202 forms a non-volatile storage part or means, and stores programs to be executed by the CPU 201, fixed parameters and the like. The ROM 202 may be formed by a rewritable storage part or means, so as to enable updating of the data stored in the rewritable storage part or means.

The RAM 203 forms a storage part or means for temporarily storing data that are used and for providing a work area or memory for the CPU 201.

The non-volatile memory 204 forms a rewritable non-volatile storage part or means, made up of a flash memory, a Hard Disk Drive (HDD) or the like, for storing the programs to be executed by the CPU 201, the setting information which needs to be held even after the power of the operation request accepting apparatus 20 is turned OFF, parameter values and the like. The setting indicating whether or not to make the recording medium 30 non-essential, and the setting information read from the recording medium 30 are also stored in the non-volatile memory 204.

The communication interface 205 connects the operation request accepting apparatus 20 to a network such as the LAN and the Internet or, to an exclusive cable, to enable the communication between the communication apparatus 10 and the operation request accepting apparatus 20. For example, the communication interface 205 may be formed by a network interface for making an Ethernet (registered trademark) communication. When the operation request accepting apparatus 20 communicates with another apparatus, the communication interface 205 and the CPU 201 function as a communicating part or means. The communication interface 205 may be appropriately selected depending on the standard used for the communication, the communication protocol used, and the like. In addition, it is possible to provide a plurality of communication interfaces 205 so as to cope with a plurality of standards.

The recording medium interface 206 corresponds to the interface 25 shown in FIG. 1, and is used to connect the recording medium 30 to the operation request accepting apparatus 20. A standard interface may be used for the recording medium interface 206 depending on the recording medium 30 used. The CPU 201 can read the setting information of various items from the recording medium 30 that is connected to the recording medium interface 206, and carry out an operation in accordance with the contents of the setting information. If the recording medium 30 is writable, it is possible to write the setting information to the recording medium 30 from the operation request accepting apparatus 20.

Although not shown in FIG. 2, the operation request accepting apparatus 20 may be provided with an engine part for making a physical output other than the communication with respect to the outside. In the case where the operation request accepting apparatus 20 is the printer or the facsimile apparatus, this engine part is formed by an image forming part or means, for example. In this case, the CPU 201 appropriately controls the operation of the image forming part or means (that is, the engine part) so as to make the operation request accepting apparatus 20 execute a print operation.

On the other hand, the hardware structure of the communication apparatus 10 may be formed by a known computer having a CPU, a ROM, a RAM, a communication interface (I/F) and the like. By making the CPU of this computer execute appropriate control programs, various parts of the communication apparatus 10 may be controlled to realize various functions related to the characterizing features of this embodiment described hereunder.

Figure 3A:
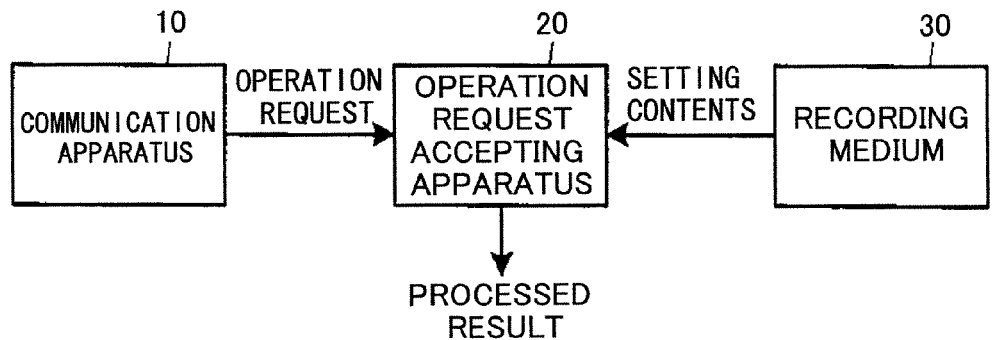
FIGS. 3A and 3B are diagrams for explaining characterizing features of the communication system shown in FIG. 1.
Figure 3B:
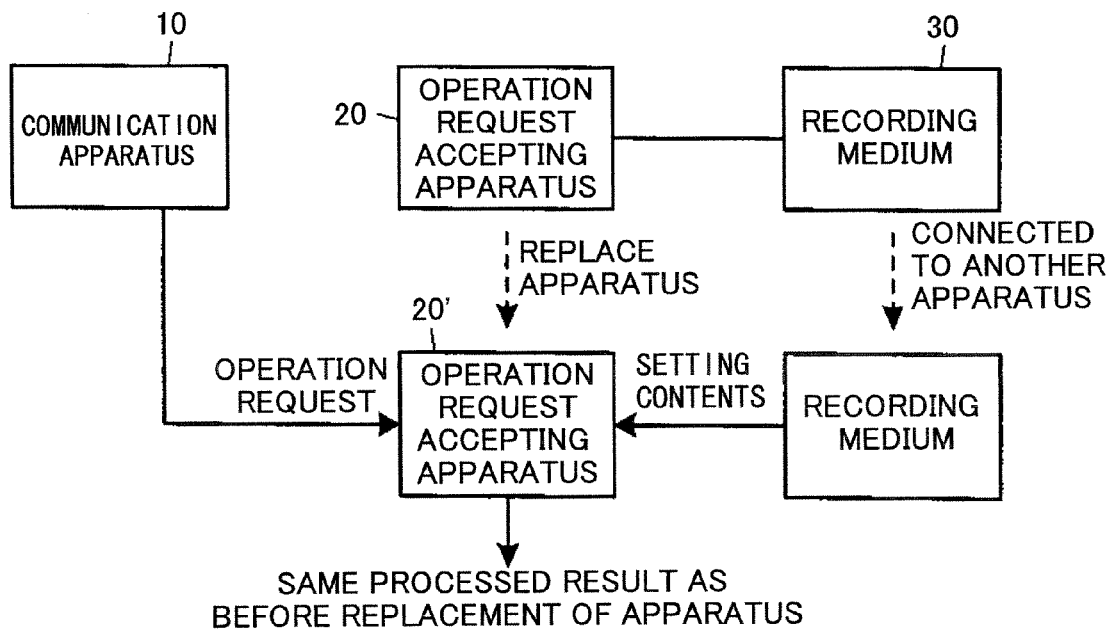

Next, a description will be given of the characterizing features of the communication system, by referring to FIGS. 3A and 3B. FIGS. 3A and 3B are diagrams for explaining the characterizing features of the communication system shown in FIG. 1.

In the operation request accepting apparatus 20 described above, if the setting information of the various items to be used by the operation request accepting apparatus 20 is recorded in the recording medium 30, it is possible to make the operation request accepting apparatus 20 read the setting information by the function of the setting managing part 21 and operate according to the setting information, as shown in FIG. 3A.

Accordingly, the settings necessary for the communication between the communication apparatus 10 and the operation request accepting apparatus 20, such as the IP address, are made without requiring the user to make a setting operation, and the operation request accepting apparatus 20 can assume a state where the communication apparatus 10 is able to transmit the operation request with respect to the operation request accepting apparatus 20. In addition, the operation request accepting apparatus 20 can assume a state capable of carrying out an operation according to the operation request.

Furthermore, as shown in FIG. 3B, even if a failure occurs in the operation request accepting apparatus 20 and is replaced by a substitute operation request accepting apparatus 20', the recording medium 30 may be disconnected from the operation request accepting apparatus 20 and connected instead to the substitute operation request accepting apparatus 20', so that the substitute operation request accepting apparatus 20' may operate similarly to the operation request accepting apparatus 20 according to the setting information read from the recording medium 30.

Particularly with respect to the setting related to the communication, such as the IP address, the substitute apparatus having the same setting as the original apparatus may be regarded by the apparatus at the remote end as being the same as the original apparatus. Hence, it is possible to use the substitute operation request accepting apparatus 20' similarly to the original operation request accepting apparatus 20, without hanging the settings at the communication apparatus 10. For this reason, if a small number of substitute apparatuses are stored in a storage or the like, even a user who is unfamiliar with the apparatus (or, does not have much knowledge of the apparatus) can utilize the substitute apparatus and simply continue the work originally intended for the original apparatus in which the failure occurred. Compared to the case where a specialist for making the repairs or the settings is called, it is possible to more quickly cope with the failure of the original apparatus. In addition, it is possible to prevent problems that may be introduced if the user were to make an erroneous setting. Furthermore, it is possible to shorten the operation time required to restore the communication system compared to the case where the specialist for making the repairs of the settings is called, because the specialist would still need to make the necessary settings related to the new apparatus, for example.

Therefore, when using the operation request accepting apparatus which accepts the operation request from the remote end, it is possible to easily build, at a low cost, an environment in which the work of the original operation request accepting apparatus can quickly be continued by the substitute operation request accepting apparatus even if a failure occurs in the original operation request accepting apparatus.

It is desirable that the model or type of the substitute operation request accepting apparatus 20' is identical to the model or type of the original operation request accepting apparatus 20 because the setting information will become the same, however, the two apparatuses 20' and 20 do not necessarily have to be the same model or type. If at least the setting information that is used when the communication apparatus 10 transmits the operation request with respect to the operation request accepting apparatus 20 is recorded in the recording medium 30, the substitute operation request accepting part 20' may receive and accept the operation request from the communication apparatus 10 by reading and using the setting information from the recording medium 30. Therefore, it is not essential for the contents of the process in accordance with the operation request to be the same before and after the replacement of the original operation request accepting apparatus 20 by the substitute operation request accepting apparatus 20'. Moreover, the contents of the process carried out by the operation request accepting apparatus 20 do not necessarily require the processed result to be output to the outside.

As a method of making the setting in the substitute operation request accepting apparatus 20', it is possible to make the substitute operation request accepting apparatus 20' automatically communicate with a setting server or another network equipment, so as to acquire the setting information necessary for the process in accordance with the operation request. But even in this case, the setting information cannot be acquired unless at least the setting related to the communication has been made. In other words, if the setting information related to the communication is read from the recording medium 30 for use in the substitute operation request accepting apparatus 20', the other setting information may be acquired by appropriately accessing the server.

The substitute operation request accepting apparatus 20' may have been used at another location in the past, and the non-volatile memory 204 may still store the setting information related to the previous use. But since it is possible to make the setting such that the recording medium 30 is regarded to be essential, the substitute operation request accepting apparatus 20' can read and use the desired setting information recorded in the recording medium 30 and operate similarly to the original operation request accepting apparatus 20 which was replaced.

On the other hand, if the setting is such that the recording medium 30 is regarded to be non-essential (or, the setting is made to cancel the essential setting of the recording medium 30), the original operation request accepting apparatus 20 may operate without the use of the recording medium 30 in an environment in which the quick restoration of the communication system by the use of the substitute operation request accepting apparatus 20' is unnecessary. In such an environment, the operation request accepting apparatus 20 can be used without requiring the additional cost of the recording medium 30 which is non-essential. Accordingly, the usage of the operation request accepting apparatus 20 is increased, and the cost of the entire communication system can be reduced by the effects of mass production of the operation request accepting apparatus 20.

Second Embodiment

FIGS. 4 to 17B

Figure 4:
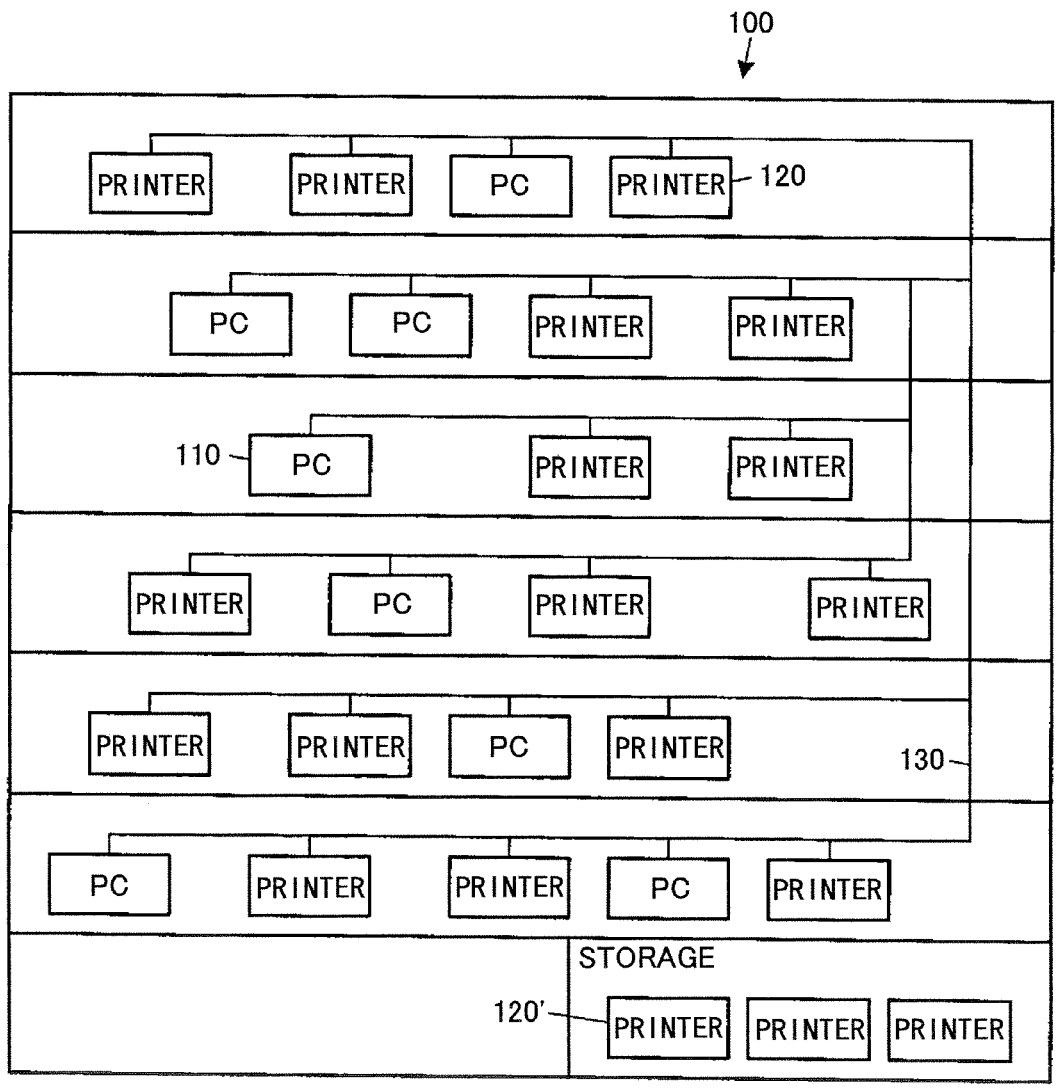
FIG. 4 is a diagram showing a printing system forming a second embodiment of the communication system according to the present invention.

Next, a description will be given of a second embodiment of the communication system according to the present invention. FIG. 4 is a diagram showing a printing system forming this second embodiment of the communication system according to the present invention.

As shown in FIG. 4, a printing system 100 includes a plurality of personal computers (PCs) 110 and printers 120 that are connected via a network 130 such as the LAN. For example, the working printers 120 are set up at various locations within a building of a company A and used for the work at the respective locations. Further, substitute printers (or reserve printers) 120' are stored in a storage, and each substitute printer 120' is used to replace the working printer 120 in use if a failure or the like occurs in the working printer 120 to make the continued use of the working printer 120 impossible. For example, the number of substitute printers 120' stored in the storage is 1/10 the number of working printers 120 used in the printing system 100.

In the printing system 100, the PC 110 operates as a host computer with respect to the printers 120. The PC 110 forms a communication apparatus having a part or means for transmitting a print request, which is an operation request, requesting execution of a print with respect to a target printer 120, in response to an instruction from the user or, based on the external data received from the outside or, automatically. It is possible to provide a print server (not shown) which allocates a suitable printer, as the target printer 120, for the print request.

The print request may be the print data that is created by a printer driver and is written with the printing contents in the printer language. This print request, which is the print data, may be transferred using an arbitrary protocol that is generally usable for the communication between a PC and a printer having an IP address, such as the Transmission Control Protocol/Internet Protocol (TCP/IP), Line PRinter daemon protocol (LPR) and port 9100.

Of course, it is possible to create and transfer the print request utilizing the SOAP/HTTP, and the print request may be transferred using protocols other than those described above.

On the other hand, the printer 120 forms an operation request accepting apparatus. In addition, the printer 120 is an image forming apparatus which forms an image on a recording medium such as paper according to the print request.

Figure 5:
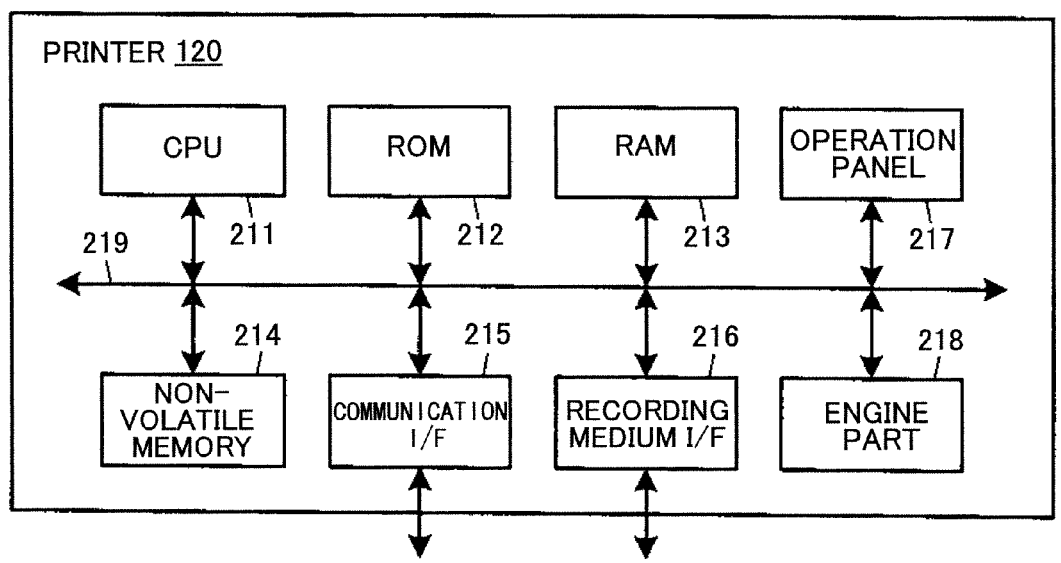
FIG. 5 is a system block diagram showing a hardware structure of a printer shown in FIG. 4.

FIG. 5 is a system block diagram showing a hardware structure of the printer 120 shown in FIG. 4.

As shown in FIG. 5, the printer 120 has a CPU 211, a ROM 212, a RAM 213, a non-volatile memory 214, a communication interface (I/F) 215, a recording medium interface (I/F) 216, an operation panel 217 and an engine part 218 that are connected via a system bus 219.

The CPU 211, the ROM 212, the RAM 213, the non-volatile memory 214, the communication interface 215, the recording medium interface 216 and the system bus 219 may respectively be the same as the CPU 201, the ROM 202, the RAM 203, the non-volatile memory 204, the communication interface 205, the recording medium interface 206 and the system bus 207 of the operation request accepting apparatus 20 shown in FIG. 2, and a description thereof will be omitted. In this particular case, the recording medium interface 216 has 2 SD memory card slots, and uses SD memory cards as the recording media.

The operation panel 217 forms an operation and display part or means for realizing the function of accepting a setting operation with respect to the printer 120 and displaying the set contents of the printer 120. The operation panel 217 includes keys and/or buttons for accepting a user operation, a liquid crystal panel for displaying information, a control circuit associated with the keys and/or buttons and the liquid crystal panel, and the like.

The engine part 218 forms an image forming part or means for forming an image on the recording medium such as paper. A known printer engine may be used for the engine part 218 to suit the needs. The image forming technique used by the engine part 218 may be the electrophotography technique, the ink-jet technique, the thermal transfer technique or, other appropriate techniques.

The PC 110 may have a known hardware structure including a CPU, a ROM, a RAM, an HDD, a communication interface (I/F) and the like. By making the CPU of this PC 110 execute appropriate control programs, various parts of the PC 110 may be controlled to realize various functions related to the characterizing features of this embodiment.

Figure 6:
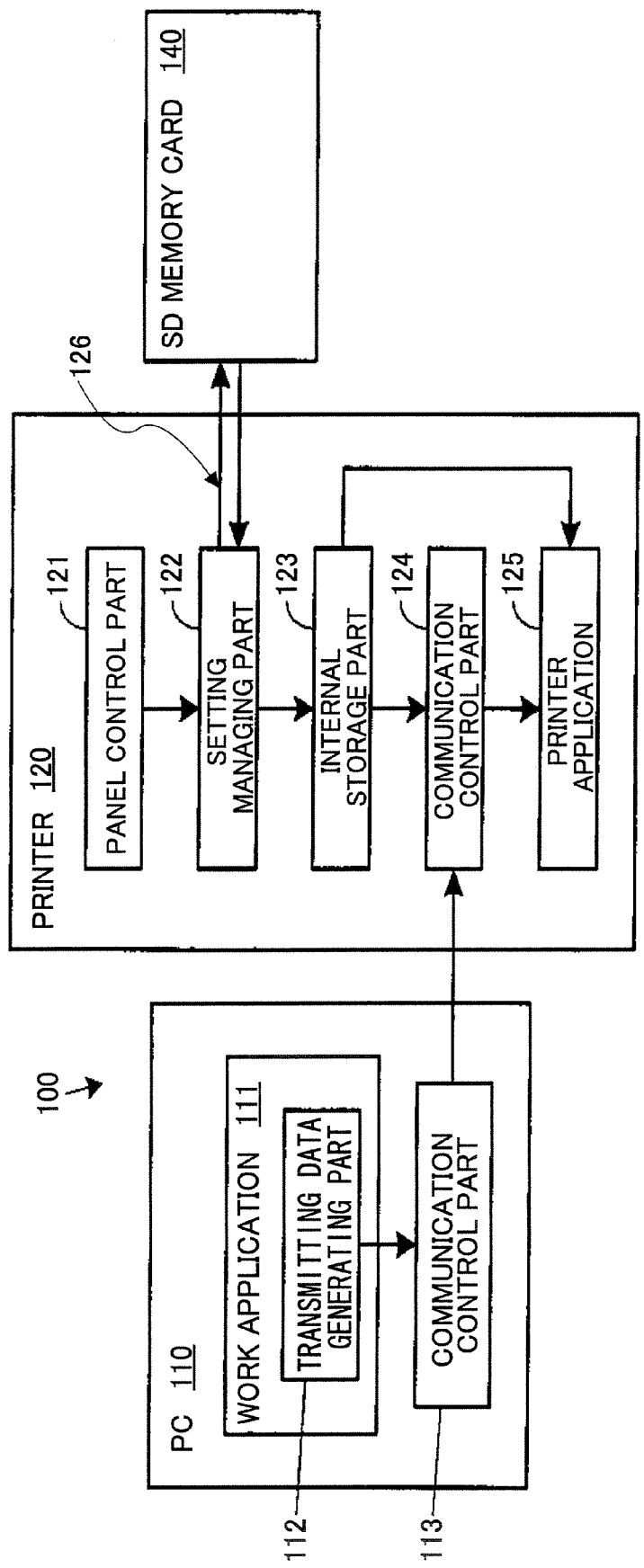
FIG. 6 is a diagram showing a functional structure of each apparatus in the printing system shown in FIG. 4.

Next, a description will be given of the functional structure of each apparatus in the printing system 100 shown in FIG. 4, by referring to FIG. 6. FIG. 6 is a diagram showing the functional structure of each apparatus in the printing system 100 shown in FIG. 4. One PC 110 which functions as the host computer and one printer 120 will be described for the sake of convenience.

As shown in FIG. 6, the PC (host computer) 110 of the printing system 100 has a work application 111 and a communication control part 113.

The work application 111 is an application program that runs on the PC 110 to realize the functions necessary to carry out the work such as accounting, newspaper article creation and sales management. FIG. 6 shows the function provided by this application program. In addition, the application program may be selected from general-purpose application programs for word processor, spreadsheet, database, drawing creation, image processing and the like or, may be a combination of such general-purpose application programs.

The work application 111 includes, as the function of a transmitting data generating part 112, the function of creating the data that is transmitted to the printer 120 and instructs the execution of the printing. A portion or all of the function of the transmitting data generating part 112 may be provided in a printer driver that is separate from the work application 111.

On the other hand, the communication control part 113 has the function of communicating with an external apparatus, and the function of transmitting the data created by the transmitting data generating part 112 to the printer 120 via the network 130. The printer 120 to which the data is to be transmitted (that is, the destination of the data) may be specified by destination information such as the IP address.

The printer 120 has a panel control part 121, a setting managing part 122, an internal storage part 123, a communication control part 124, a printer application 125, and a recording medium interface 126.

The panel control part 121 controls the operation panel 217, and has the function of accepting the setting operation with respect to the printer 120 made by the user, and displaying the set contents of the printer 120.

The setting managing part 122 has the function of reading the setting information of predetermined items from an SD memory card 140 that is connected to the printer 120 via the recording medium interface 126, and storing the contents of the setting information in the internal storage part 123 to thereby make the setting in the printer 120. The setting managing part 122 also has the function of changing the setting information stored in the internal storage part 123 depending on the operation accepted by the panel control part 121, and writing the setting information stored in the internal storage part 123 to the SD memory card 140.

It is desirable that the items that are read from the SD memory card 140 and the items that are written to the SD memory card 140 match. The items to be read from and written to the SD memory card 140 may be prescribed by the firmware level or the hardware level or, made selectable by the user.

The internal storage part 123 forms a storage part or means for storing the setting information that is referred to by the printer 120 when the printer 120 operates. The internal storage part 123 may be provided in the non-volatile memory 214. The internal storage part 123 at least stores the setting information indicating whether or not to accept the operation request from the external apparatus such as the PC 110 (that is, whether or not to make the SD memory card 140 non-essential) when the necessary setting information cannot be read from the SD memory card 140. When the SD memory card 140 is set to be essential (that is, not non-essential), it is possible to additionally disable the writing of the setting information with respect to the internal storage part 123 or not to accept the operation request from the external apparatus when the setting information cannot be written to the SD memory card 140.

For example, information shown in the following Tables 1 through 3 may be stored as the setting information in the internal storage part 123.

The Table 1 shows the setting information for making the network communication, namely, the data items and the corresponding set contents that are set. When transmitting the print request from the PC 110 to the printer 120 using the TCP/IP, it is necessary to at least set the IP address in the printer 120.

TABLE 1

| Data Item | Set Contents |
|---|---|
| DHCP | OFF |
| IP Address | 192.168.0.2 |
| Sub Net Mask | 255.255.255.0 |
| Gateway Address | 192.168.0.1 |
| Effective Protocol | TCP/IP |
| Communication Speed | Automatic Setting |

The Table 2 shows the setting related to the use of the SD memory card 140. The "SD Card Use Setting" indicates the item for setting whether or not to use the SD memory card 140 when operating the printer 120, "SD Card Essential Setting" indicates the item for setting whether or not the SD memory card 140 is essential (or non-essential), and "Storage Destination Slot" indicates the item for setting the slot to which the SD memory card 140 from which the setting information is to be read and to which the setting information is to be written is connected. The operation of the printer 120 according to the set contents of each item shown in the Table 2 will be described later.

TABLE 2

| Data Items | Set Contents |
|---|---|
| SD Card Use Setting | Use |
| SD Card Essential Setting | Essential |
| Storage Destination Slot | Left Slot |

The Table 3 shows the setting information used to control the print operation. This setting information is used to set the form, font, paper supply tray, emulation language, kind of paper and the like that are to be used for the printing.

TABLE 3

| Data Items | Set Contents |
|---|---|
| Form | Prescription |
| Font | Font For Prescription |
| Priority Tray | Tray 1 |
| Emulation Calling | RPCS |
| Kind of Paper | 105-163 g/m$^2$ |

Of course, it is possible to store setting information with respect to items other than the items described above. For example, it is possible to store an external character table. In addition, it is not necessary to read and write all of such setting information from and to the SD memory card 140. In this embodiment, it is assumed for the sake of convenience that the setting information related to the use of the SD memory card 140 shown in the Table 2 is only stored in the printer 120.

The communication control part 124 has the function of communicating with the external apparatus such as the PC 110 according to the setting information stored in the internal storage part 123, accepting at least the print request from the PC 110, and supplying the print request to the printer application 125.

In the case where the setting in the internal storage part 123 makes the recording medium (SD memory card 140) essential (or not non-essential), the communication control part 124 does not accept the print request (or operation request) from the external apparatus. Such a case occurs when the SD memory card 140 is not connected to the interface 126 or, the necessary setting information is not recorded in the SD memory card 140 or, a failure or the like exists in the SD memory card 140, and the predetermined necessary setting information, such as the IP address of the printer 120 used by the remote end when transmitting the print request to the printer 120, cannot be read from the SD memory card 140.

The printer application 125 has the function of controlling the engine part 218 depending on the received print request, and executing the print operation according to the requested contents. In this state, the printer application 125 controls the engine part 218 by referring to the setting information stored in the internal storage part 123.

In the printing system 100 shown in FIG. 4, the printer 120 has the structure described above to read the setting information recorded in the SD memory card 140, and to receive the print request from the PC 110 and carry out the print operation according to the requested contents, based on the read setting information. In addition, the change in the setting made by the user operation may be reflected to the setting information that is recorded in the SD memory card 140.

Next, a description will be given of the processes related to the characterizing features of the present invention that are carried out by CPUs of the PC 110 and the printer 120.

Figure 7:
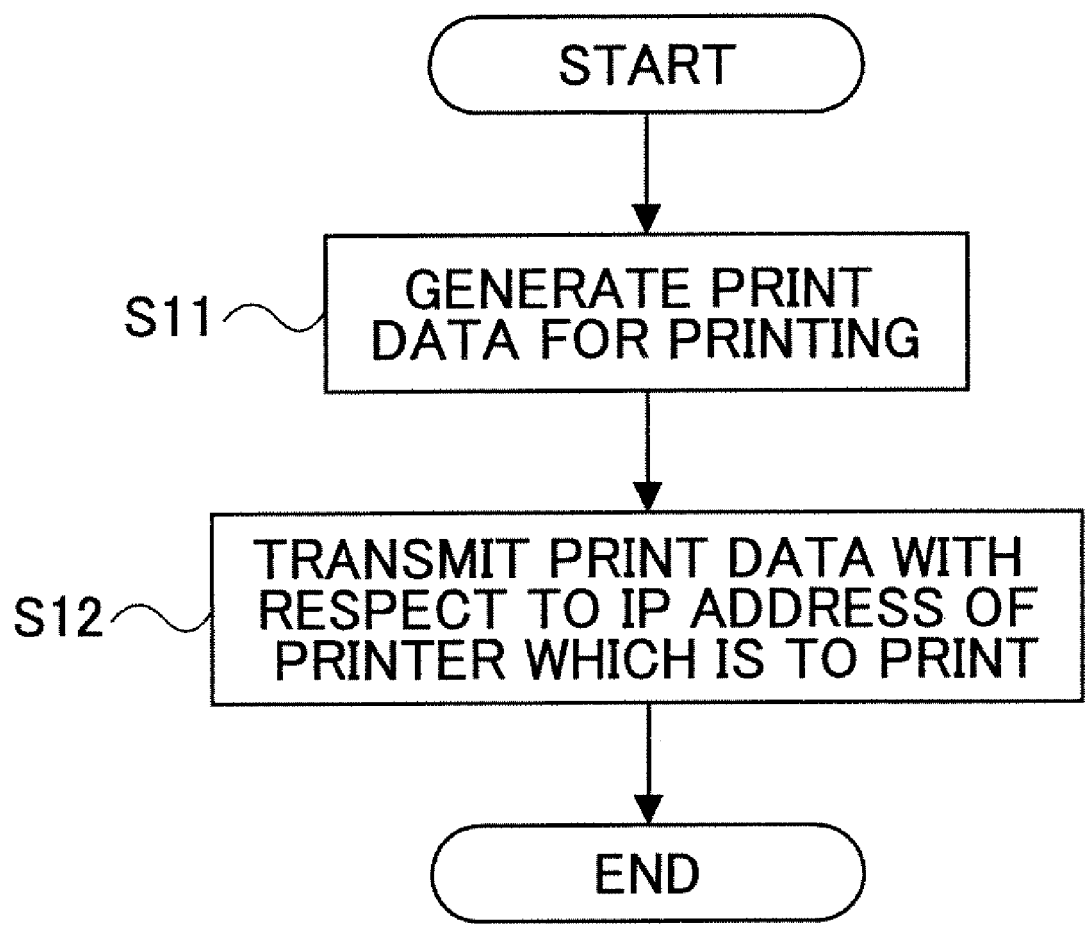
FIG. 7 is a flow chart for explaining a process of a CPU of a personal computer when the personal computer shown in FIG. 6 sends a print request to the printer.

FIG. 7 is a flow chart for explaining the process of the CPU of the PC 110 when the PC 110 shown in FIG. 6 sends the print request to the printer 120.

The CPU of the PC 110 starts the process shown in FIG. 7 when it becomes necessary to cause the printer 120 to execute a printing, such as when a user's print instruction is received or data requiring a print-out is received.

A step S11 generates the print data to be printed, which is written in the printer language. When the printer 120 receives the print data, this print data corresponds to the print request (that is, this print data is regarded as the print request) because the printer 120 interprets that the execution of the printing according to the contents of the print data has been instructed.

Thereafter, a step S12 transmits the print data with respect to the IP address of the printer 120 that is to execute the printing, and the process ends.

According to the process shown in FIG. 7, the PC 110 can request the execution of the printing with respect to the desired printer 120 that is to execute the printing.

Figure 8:
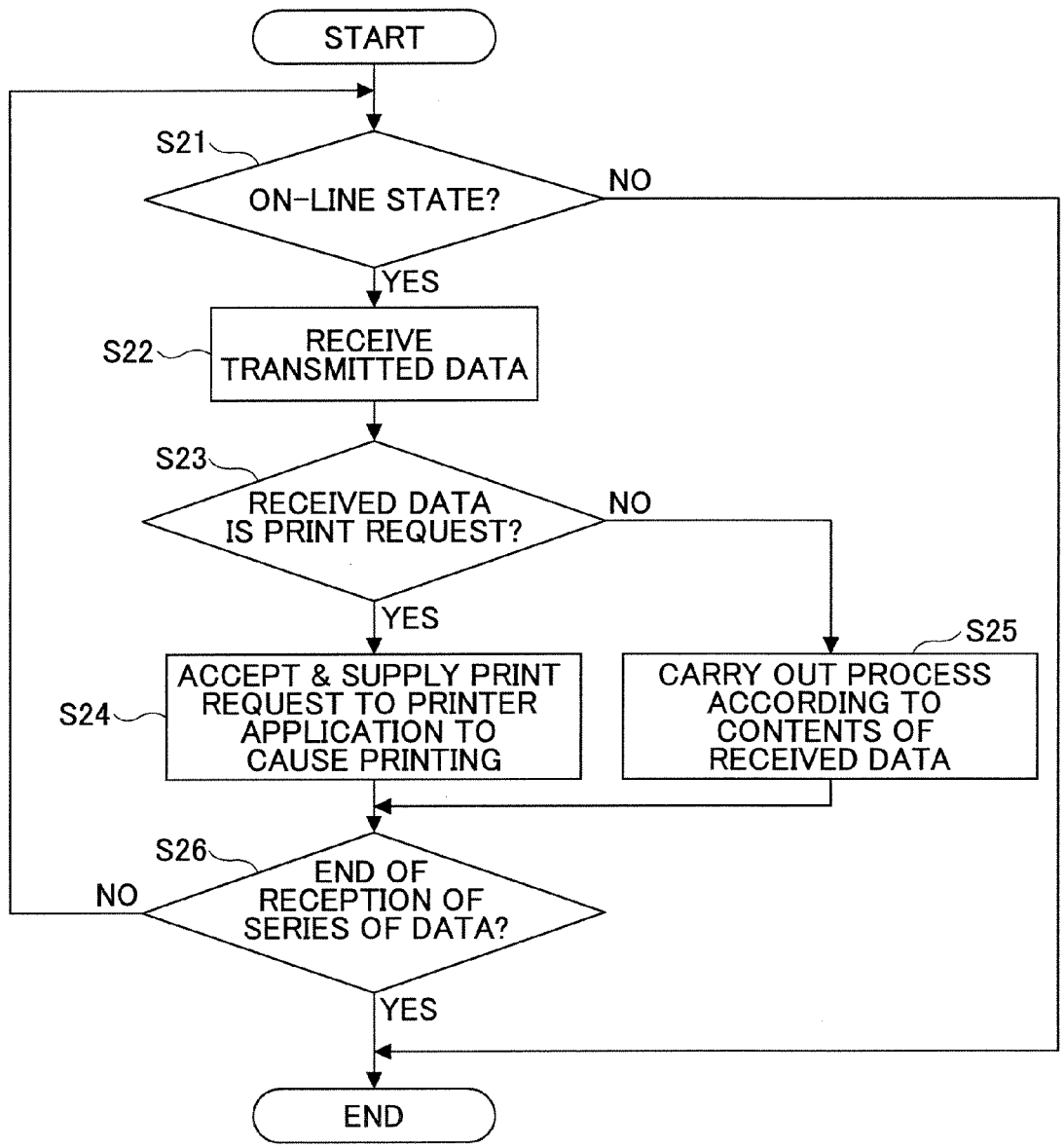
FIG. 8 is a flow chart for explaining a process of a CPU of a printer when an external apparatus sends data to the printer shown in FIG. 6.

FIG. 8 is a flow chart for explaining the process of the CPU 211 of the printer 120 when an external apparatus sends data to the printer 120 shown in FIG. 6.

The CPU 211 of the printer 120 starts the process shown in FIG. 8 when the data from the external apparatus is received at the communication interface 215.

First, a step S21 decides whether or not the printer 120 is in an on-line state (that is, a state for accepting an operation request from the external apparatus). If the decision result in the step S21 is YES, the process advances to a step S22 which receives the data via the communication interface 215.

A step S23 decides whether or not the received data is a print request. If the decision result in the step S23 is YES, a step S24 accepts the print request and supplies the print request to the printer application 215 which executes the printing according to the print request. After the step S24, a step S26 decides whether or not the reception of the series of data has ended, and the process ends if the decision result in the step S26 is YES. On the other hand, if the decision result in the step S26 is NO, the process returns to the step S21. If the decision result in the step S23 is NO, a step S25 carries out a process (including an error process) according to the contents of the received data, and the process advances to the step S26.

If the decision result in the step S21 is NO, the process ends. But in this case, the remote end receives no reaction from the printer 120, and can thus recognize that the data set from the remote end was not received by the printer 120.

According to the process shown in FIG. 8, when the printer 120 is in the on-line state and receives the print request from the external apparatus such as the PC 110, the printer 120 can carry out the print operation according to the print request. In addition, when the printer 120 is not in the on-line state (that is, in the off-line state), the printer 120 can refuse to accept the operation request from the external apparatus.

In the process described above, the PC 110 sends the print data to the predetermined IP address or, the IP address that is stored as the output destination specified by the user, regardless of the location of the remote end apparatus (and in some cases, regardless of the kind of remote end apparatus). In addition, the printer 120 carries out the print operation in the same manner regardless of the external apparatus from which the print data is received.

Accordingly, even if the printer 120 is replaced by the substitute printer 120', it is possible to send the print data from the PC 110 and make the substitute printer 120' carry out the print operation similarly to the print operation that would have been carried out by the replaced original printer 120 if no failure existed therein, by setting the IP address of the replaced original printer 120 to the substitute printer 120'. In other words, even if the original printer 120 is replaced by another printer of the same model or type, it is impossible to send the print data correctly from the PC 110 to this other printer unless the IP address of the original printer 120 is set in this other printer.

In this embodiment, the IP address of the printer 120 can be read from the SD memory card 140 as the setting information, and the read IP address may be used as the IP address of this printer 120. Hence, by connecting the SC memory card 140 that was connected to the original printer 120 to the substitute printer 120' when replacing the original printer 120 by the substitute printer 120', it becomes possible for the substitute printer 120' to read from the SD memory card 140 and use the IP address that was used by the original printer 120. The substitute printer 120' can then receive the print data from the PC 110 in the same manner as would have been received by the replaced original printer 120 if no failure existed therein, without having to change the settings in the PC 110.

Figure 9:
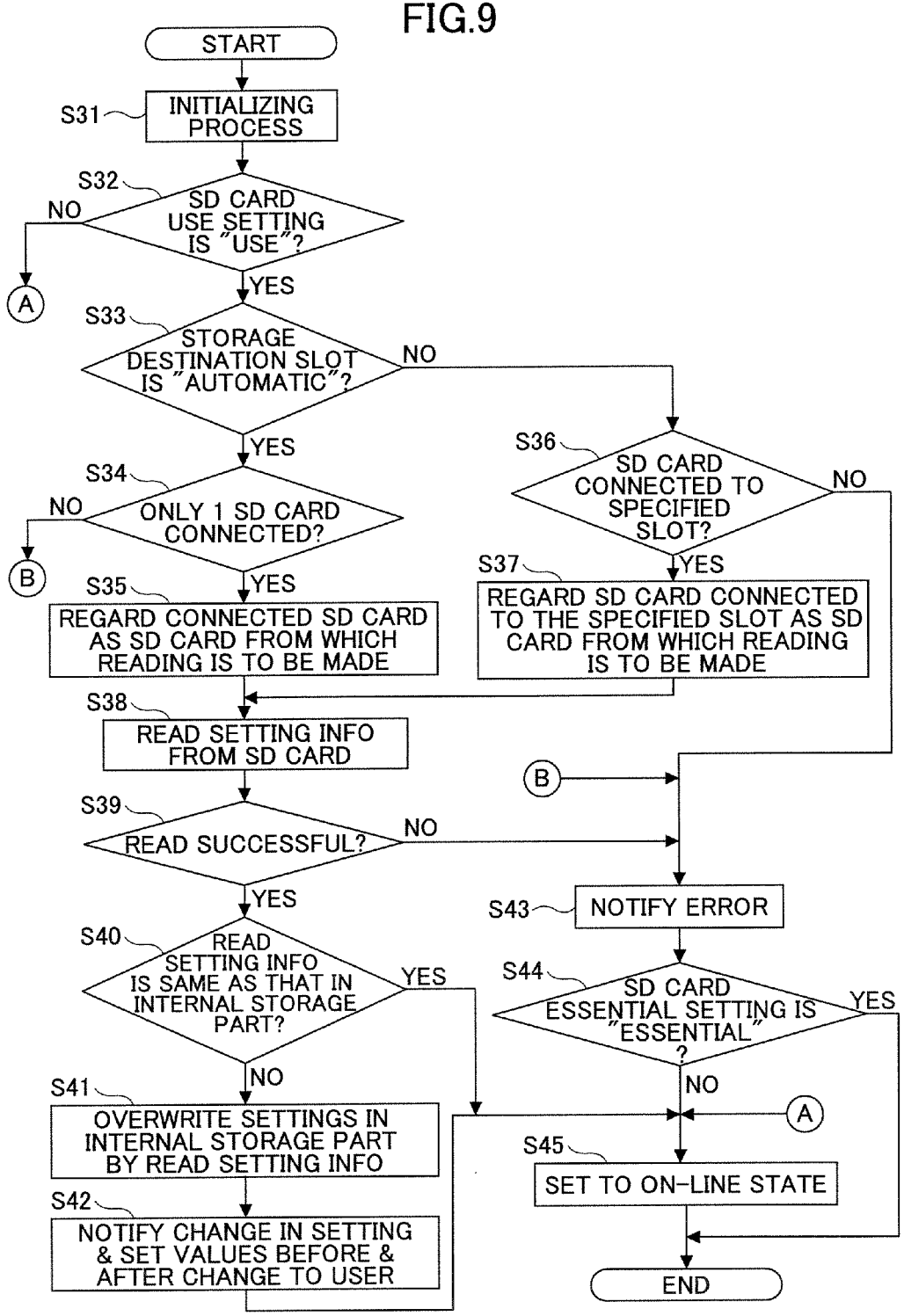
FIG. 9 is a flow chart for explaining a process of the CPU of the printer when the printer is started.

FIG. 9 is a flow chart for explaining the process of the CPU 211 of the printer 120 when the printer 120 is started, as a process related to the reading of the setting information from the SD memory card 140.

The CPU 211 of the printer 120 starts the process shown in FIG. 9 when the power of the printer 120 is turned ON or the printer 120 is restarted.

First, a step S31 carries out an initializing process to initialize various parts of the printer 120. Since such an initializing process is known, a detailed description thereof will be omitted.

Thereafter, a step S32 decides whether or not the "SD Card Use Setting" shown in the Table 2 is "Use". If the decision result in the step S32 is YES, the process advances to a step S33 to carry out the process related to the reading of the setting information from the SD memory card 140.

The steps S33 through S37 determine the SD memory card from which the setting information is to be read. In other words, if the "Storage Destination Slot" is set to "Automatic" to indicate the reading of the setting information from the sole SD memory card that may be connected to any slot, and only one SD memory card 140 is actually connected to the printer 120, this SD memory card 140 is regarded as the SD memory card from which the setting information is to be read. On the other hand, if the "Storage Destination Slot" is set to a specific slot and the SD memory card 140 is connected to the specific slot, this SD memory card 140 is regarded as the SD memory card from which the setting information is to be read. Otherwise, an error is detected because it is impossible to determine the SD memory card from which the setting information is to be read.

The process advances to a step S38 when the SD memory card from which the setting information is to be read is determined by the above described process. The step S38 reads the necessary setting information from the SD memory card 140 that is determined as the SD memory card from which the setting information is to be read. The CPU 211 functions as a reading part or means when the process of the step S38 is carried out.

A step S39 decides whether or not the reading of the setting information from the SD memory card 140 is successful. If the decision result in the step S39 is YES, a step S40 decides whether or not the read setting information is the same as the setting information stored in the internal storage part 123. The decision in the step S40 may be made by comparing only the setting information of the items read from the SD memory card 140.

If the decision result in the step S40 is NO, a step S41 overwrites the setting information of the corresponding items stored in the internal storage part 123 by the setting information of the items read from the SD memory card 140. A step S42 notifies the user of the change in the setting information and the set values before and after the change. This notification may be made as shown in FIG. 10, for example. FIG. 10 is a diagram showing printing contents for notifying the user when the setting information of the internal storage part 123 is changed during the process shown in FIG. 9. Instead of printing the image shown in FIG. 10 in which the changes in the setting information are indicated within rectangles, it is possible to display the image on the operation panel 217 or, to notify the user by other methods. After the step S42, a step S45 sets the printer 120 to the on-line state, and the process ends. If the decision result in the step S40 is YES, it is unnecessary to change the setting information within the internal storage part 213, and thus, the process advances to the step S45 to set the printer 120 to the on-line state, and the process ends.

On the other hand, if the SD memory card from which the setting information is to be read cannot be determined by the steps S33 through S37 and the decision result in the step S34 or S36 is NO or, the decision result in the step S39 is NO, the step S43 makes the error notification to the user because the setting information could not be read from the SD memory card even though the setting indicates the use of the SD memory card. As described above, this error notification may be made by an arbitrary method, such as making a print-out on the recording medium such as paper and making a display on the operation panel 217.

After the step S43, a step S44 decides whether or not the "SD Card Essential Setting" shown in the Table 2 is "Essential". If the decision result in the step S44 is NO, the step S45 sets the printer 120 to the on-line state, and the process ends. On the other hand, if the decision result in the step S44 is YES, the process ends in the off-line state (that is, a state that does not accept the operation request from the external apparatus), without setting the printer 120 to the on-line state. If the decision result in the step S32 is NO, the process advances to the step S45, and the process ends after setting the printer 120 to the on-line state.

In these cases, the printer 120 operates according to the setting information stored in the internal storage part 123.

According to the process shown in FIG. 9, when the setting to use the SD memory card has been made, the printer 120 when started reads the setting information from the SD memory card 140 and writes the read setting information in the internal storage part 123, according to the setting information of the items shown in the Table 2 and stored in the internal storage part 123. Hence, the printer 120 can reflect the read setting information to the operation of the printer 120 itself or, control the on-line and off-line states thereof depending on the read setting information.

In other words, in the case where the setting not to use the SD memory card has been made, the printer 120 can operate according to the setting information stored in the internal storage part 123 even if no SD memory card is connected to the printer 120. Hence, if the system configuration does not take into account replacing the printer 120 by another apparatus and there is no need to use the setting information in another apparatus, the SD memory card may be made unnecessary.

In addition, in the case where the setting to use the SD memory card has been made, the printer 120 can automatically read the setting information from the SD memory card 140 and store the contents of the read setting information in the internal storage part 123. If the setting indicates the SD memory card as being essential and the setting information cannot be read from the SD memory card 140, the printer 120 does not set itself to the on-line state, so as to prevent troubles such as communicating with the PC 110 or the like according to the setting information of the past that remains within the internal storage part 123.

For example, if the substitute printer 120' which has been used is next to be used at another location, the setting information of the IP address at the previous location remains within the internal storage part 123. Hence, by taking the above described measures, it is possible to prevent a trouble in the network communication which would otherwise occur due to an overlap of the previous IP address of the substitute printer 120' and the IP address of another printer 120 if the setting information of the previous IP address remaining within the internal storage part 123 were to become valid.

Furthermore, if the printer 120 is not put to the on-line state, the printer 120 assumes the state that does not accept the operation request from the external apparatus. However, the printer 120 can still carry out an operation according to the operation accepted by the operation panel 217, and thus, the printer 120 can be switched to the on-line state by a manual instruction input from the operation panel 217.

Even in the case where the setting has be made to use the SD memory card, it is possible to make the setting to indicate the SD memory card as being non-essential. For this reason, when initially setting up the printer 120 in the printing system 100, for example, it is possible to manually make the setting so that the printer 120 operates according to the contents of the manual setting.

The process of the steps S33 through S37 that determines the SD memory card from which the setting information is to be read is not limited to that shown in FIG. 9, and various variations of this process are possible. For example, when a plurality of SD memory cards are connected to the printer 120, it is possible to search the data recorded in the SD memory cards and to set the SD memory card that is recorded with the setting information as the SD memory card from which the setting information is to be read.

The setting information read from the SD memory card should at least include the information that is used by the PC 110 when sending the print request with respect to the printer 120. In this embodiment, the IP address is used as such information. It is desirable that the setting information that is referred to when carrying out the print operation according to the received print request, such as the form data, the font data, the tray information, the emulation information and the paper kind information (or data indicating the kind of paper), is readable from the SD memory card.

Figure 11:
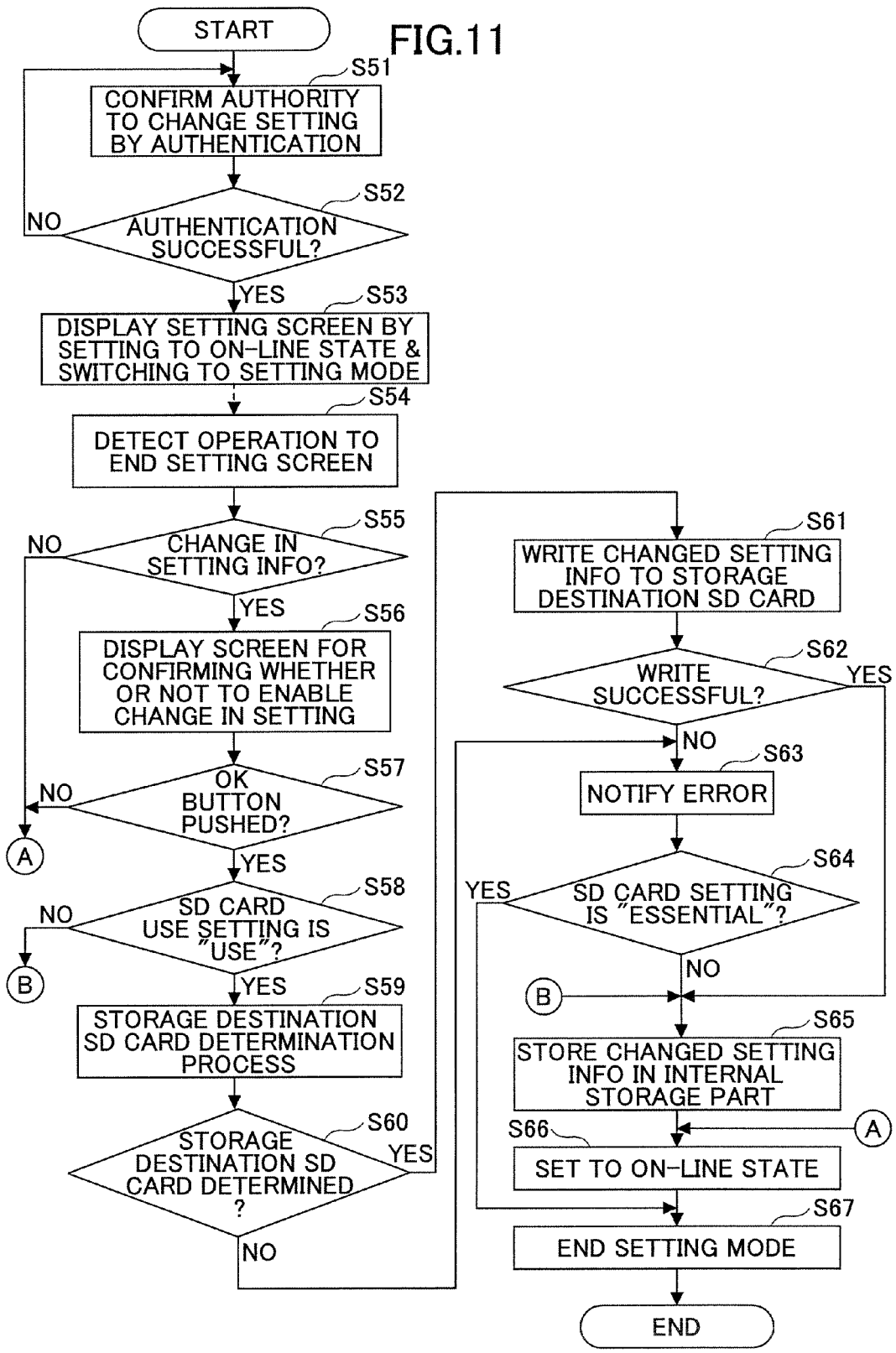
FIG. 11 is a flow chart for explaining a process of the CPU of the printer shown in FIG. 6 when changing the setting information of the internal storage part.

FIG. 11 is a flow chart for explaining the process of the CPU 211 of the printer 120 shown in FIG. 6 when changing the setting information of the internal storage part 123.

The CPU 211 of the printer 120 starts the process shown in FIG. 11 when an instruction to display a setting screen for instructing the change in the setting information stored in the internal storage part 123 is accepted from the operation panel 217.

First, a step S51 carries out an authentication to confirm that the user who instructed the display of the setting screen has the authority to change the setting information. The authentication may be made by use of a button operating sequence on the operation panel 217, a password, an IC card or the like. A step S52 decides whether or not the authentication was successful. If the decision result in the step S52 is NO, the process returns to the step S51 to retry the authentication. On the other hand, if the decision result in the step S52 is YES, a step S53 sets the printer 120 to the off-line state and switches the mode to the setting mode, so as to display the setting screen on the operation panel 217 and accept the instruction to change the setting information (hereinafter also simply referred to as the change instruction).

The illustration and description on the details of the process of accepting the change instruction, but when a step S54 thereafter detects an operation to end the display of the setting screen, a step S55 decides whether or not the change of the setting information was instructed on the setting screen. If the decision result in the step S55 is YES, a step S56 displays on the operation panel 217 a screen for confirming the enabling or disabling of the changing of the setting information.

Figure 12:
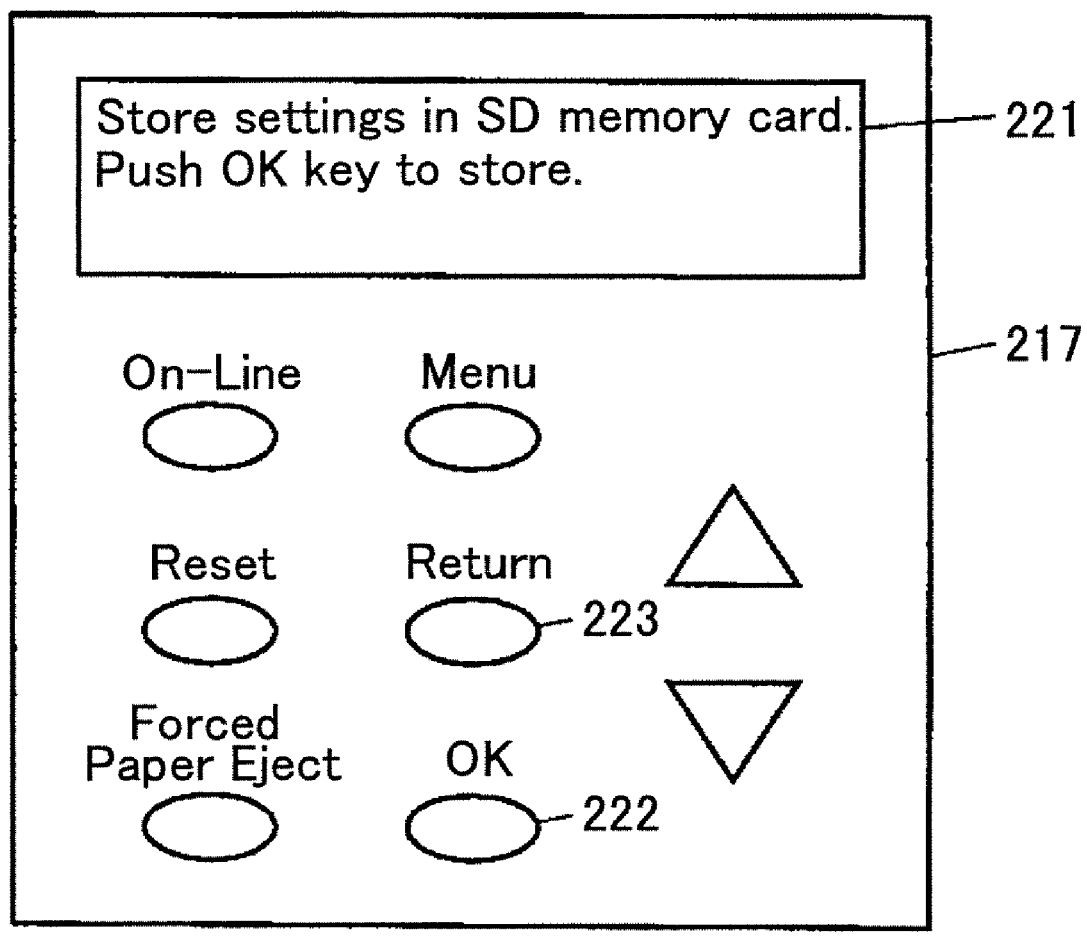
FIG. 12 is a diagram showing a structure of an operation panel of the printer and a displayed screen on which the changing or not changing of the setting information is confirmed.

FIG. 12 is a diagram showing a structure of the operation panel 217 of the printer 120 and a displayed screen on which the enabling or disabling of the changing of the setting information is confirmed. As shown in FIG. 12, a display part 221 which may be a liquid crystal display, and various buttons are provided in the operation panel 217. The screen on which the enabling or disabling of the changing of the setting information is confirmed is displayed on the display part 221 as shown in FIG. 12, and the changing of the setting information is accepted when an OK button 222 is activated or pushed.

Returning now to the description of FIG. 11, the process advances to a step S57 after the step S56. The step S57 decides whether or not the OK button 222 was pushed. For example, the decision result in the step S57 becomes YES if the OK button 222 is pushed before other buttons on the screen shown in FIG. 12 are pushed. If the decision result in the step S57 is YES, the process advances to a step S58 to carry out the process related to the storing of the setting information.

The step S58 decides whether or not the "SD Card Use Setting" the Table 2 indicates "Use". If the decision result in the step S58 is YES, the process advances to a step S59 to carry out the SD memory card determination process to determine the storage destination SD memory card.

Figure 13:
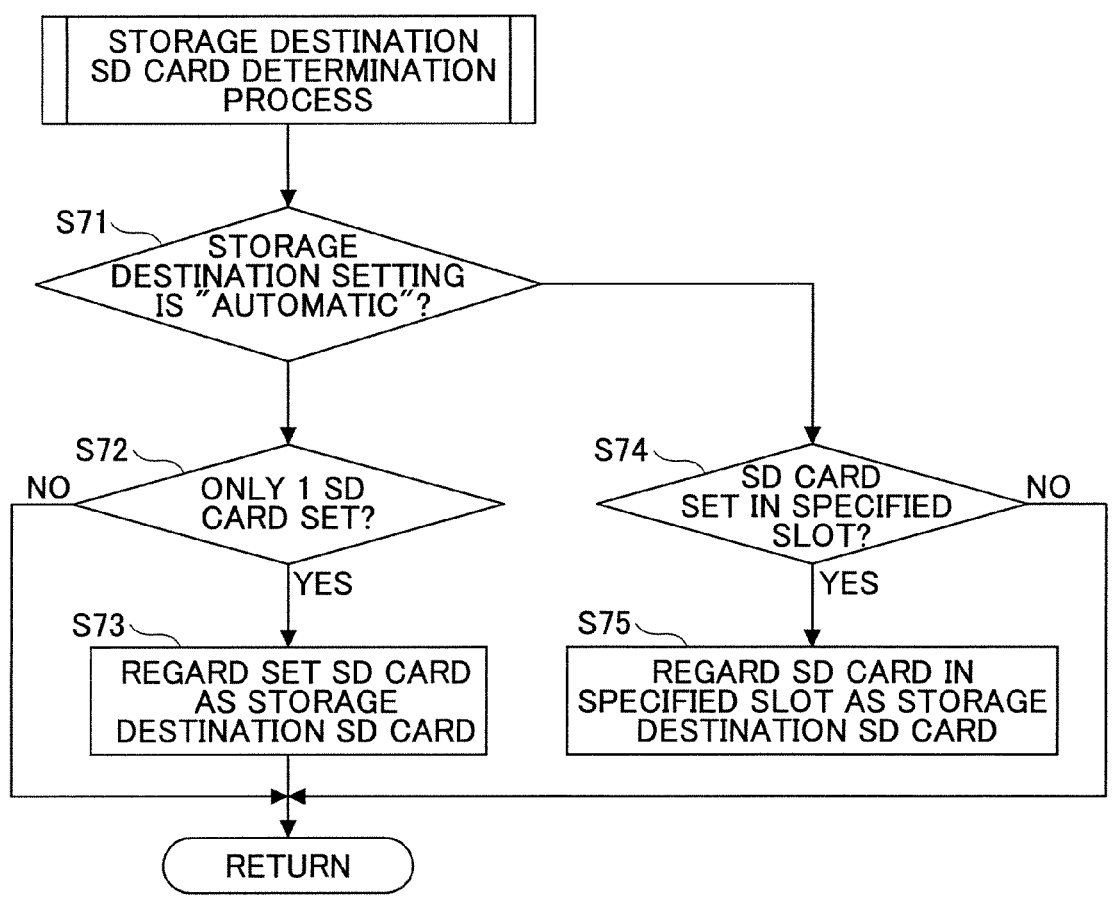
FIG. 13 is a flow chart for explaining an SD memory card determination process of a step S59 shown in FIG. 11.

FIG. 13 is a flow chart for explaining the SD memory card determination process of the step S59 shown in FIG. 11 in more detail. The process shown in FIG. 13 is generally similar to the process of the steps S33 through S37 shown in FIG. 9. That is, if the "Storage Destination Slot" is set to "Automatic" to indicate the reading of the setting information from the sole SD memory card that may be connected to any slot, and only one SD memory card 140 is actually connected to the printer 120, this SD memory card 140 is regarded as the storage destination SD memory card to which the setting information is to be stored (steps S71 through S73). On the other hand, if the "Storage Destination Slot" is set to a specific slot and the SD memory card 140 is connected to the specific slot, this SD memory card 140 is regarded as the storage destination SD memory card to which the setting information is to be stored (steps S74 and S75). Otherwise, no SD memory card determination process is carried out because it is impossible to determine the storage destination SD memory card to which the setting information is to be stored.

Returning again to the description of FIG. 11, a step S60 decides whether or not the storage destination SD memory card has been determined by the SD memory card determination process described above. If the decision result in the step S60 is YES, a step S61 writes the changed setting information to the storage destination SD memory card. Only the items of the changed setting information that are to be read from the SD memory card need to be written in the storage destination SD memory card. In addition, the CPU 211 functions as a writing part or means when the process of this step S61 is carried out.

A step S62 decides whether or not the writing of the changed setting information to the storage destination SD memory card was successful. If the decision result in the step S62 is YES, a step S65 writes the changed setting information in the internal storage part 123. A step S66 sets the printer 120 to the on-line state. A step S67 ends the setting mode of the printer 120, and the process ends. The CPU 211 also functions as the writing part or means when the process of the step S65 is carried out.

On the other hand, if the decision result in the step S60 or S62 is NO, a step S63 makes an error notification to the user because the setting information could not be written to the SD memory card even though the setting indicates the use of the SD memory card. As described above, this error notification may be made by an arbitrary method, such as making a print-out on the recording medium such as paper and making a display on the operation panel 217.

Thereafter, a step S64 decides whether or not the "SD Card Essential Setting" shown in the Table 2 is "Essential". If the decision result in the step S64 is NO, the step S65 sets the printer 120 to the on-line state, and the process ends, similarly to the above described case where the storage of the changed setting information to the storage destination SD memory card. On the other hand, if the decision result in the step S64 is YES, the step S67 ends the setting mode of the printer 120 in the off-line state, and the process ends without storing the changed setting information in the internal storage part 123.

If the decision result in the step S58 is NO, the changed setting information only needs to be stored in the internal storage part 123, and thus, the process advances to the step S65.

If the decision result in the step S55 or S57 is NO, the process advances to the step S66 because there is no need to store the setting information. The decision result in the step S57 becomes NO if a button other than the OK button 222, such as a return button 223 shown in FIG. 12, is pushed. The step S66 sets the printer 120 to the on-line state, the step S67 ends the setting mode of the printer 120, and the process ends.

According to the process shown in FIG. 11, if the setting to use the SD memory card has been made, the printer 120 when instructed to change the setting information can similarly change the setting information stored in the SD memory card 140 similarly to the internal storage part 123, and control the on-line and off-line states thereof depending on the changed result.

In addition, if the setting indicates the SD memory card as being essential and the setting information cannot be written to the SD memory card 140, the printer 120 does not write the setting information to the internal storage part 123. Hence, it is possible to prevent the setting information stored in the internal storage part 123 from becoming different from the setting information stored in the SD memory card 140, and enable the same setting as the printer 120 to be read from the SD memory card 140 even when the SD memory card 140 is connected to another printer.

On the other hand, if the setting indicates the SD memory card as being non-essential, it is possible to write the setting information only in the internal storage part 123. For this reason, when initially setting up the printer 120 in the printing system 100, for example, it is possible to manually make the setting and thereafter store the contents of the manual setting in the SD memory card 140.

The printer 120 does not set itself to the on-line state if the setting information cannot be written to the SD memory card 140. Hence, it is possible to prevent a trouble such as the printer 120 communicating with the PC 110 or the like in a state where the settings desired by the user have not been made.

The SD card determination process of the step S59 that determines the SD memory card to which the setting information is to be written is not limited to that shown in FIG. 13, and various variations of this process are possible. For example, when a plurality of SD memory cards are connected to the printer 120, it is possible to search the data recorded in the SD memory cards and to overwrite the setting information in the SD memory card that is already recorded with the setting information. In addition, if the setting information is not recorded in any of the SD memory cards or, the setting information is recorded in a plurality of SD memory cards, it is possible to write the setting information, with priority, in the SD memory card that is connected to a predetermined slot.

Figure 14:
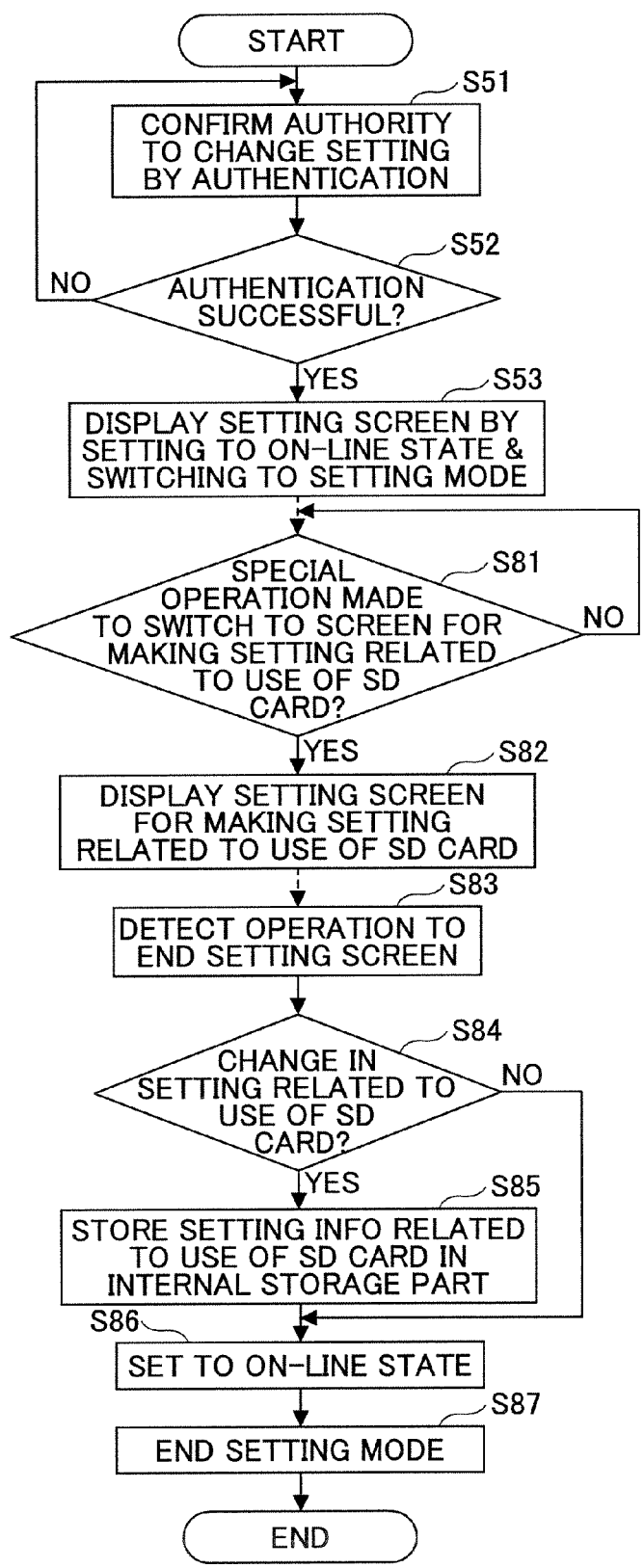
FIG. 14 is a flow chart for explaining a process of the CPU of the printer shown in FIG. 6 when changing the setting information of an item related to the use of the SD memory card.

FIG. 14 is a flow chart for explaining the process of the CPU 211 of the printer 120 shown in FIG. 6 when changing the setting information of the item related to the use of the SD memory card, as an example of a special case for the process related to the changing of the setting information shown in FIG. 11.

In the printer 120, the items related to the use of the SD memory card, that is, the items shown in the Table 2, are particularly important setting items. Accordingly, when accepting these important setting items, a user authentication is once made similarly to the step S51 shown in FIG. 11, and an exclusive authentication process is further carried out thereafter.

In other words, steps S51 through S53 shown in FIG. 14 are the same as the steps S51 through S53 shown in FIG. 11. If the decision result in the step S52 is YES and after the step S53 switches the mode to the setting mode, a step S81 is carried out as an operation of the setting mode. The step S81 decides whether or not a special operation is made on the operation panel 217 to move to the setting screen for making the settings related to the use of the SD memory card. For example, the special operation may be the simultaneous pushing of a plurality of buttons for a predetermined (or long) time, the pushing of a plurality of buttons in a predetermined sequence or, other operations that are normally not made when using the printer 120. If the special operation is known only to the user who has the authority to make the settings related to the use of the SD memory card, it is possible to carry out the authentication process based on the special operation. Of course, it is possible instead to carry out the authentication process based on an exclusive password, IC card or the like.

If the decision result in the step S81 is NO, the operation related to the normal changing of the setting is made as described above in conjunction with FIG. 11. On the other hand, if the decision result in the step S81 is YES, a step S82 displays on the operation panel 217 the setting screen for making the settings related to the use of the SD memory card, and switches the mode to a special setting mode for making the settings related to the use of the SD memory card.

Figure 15:
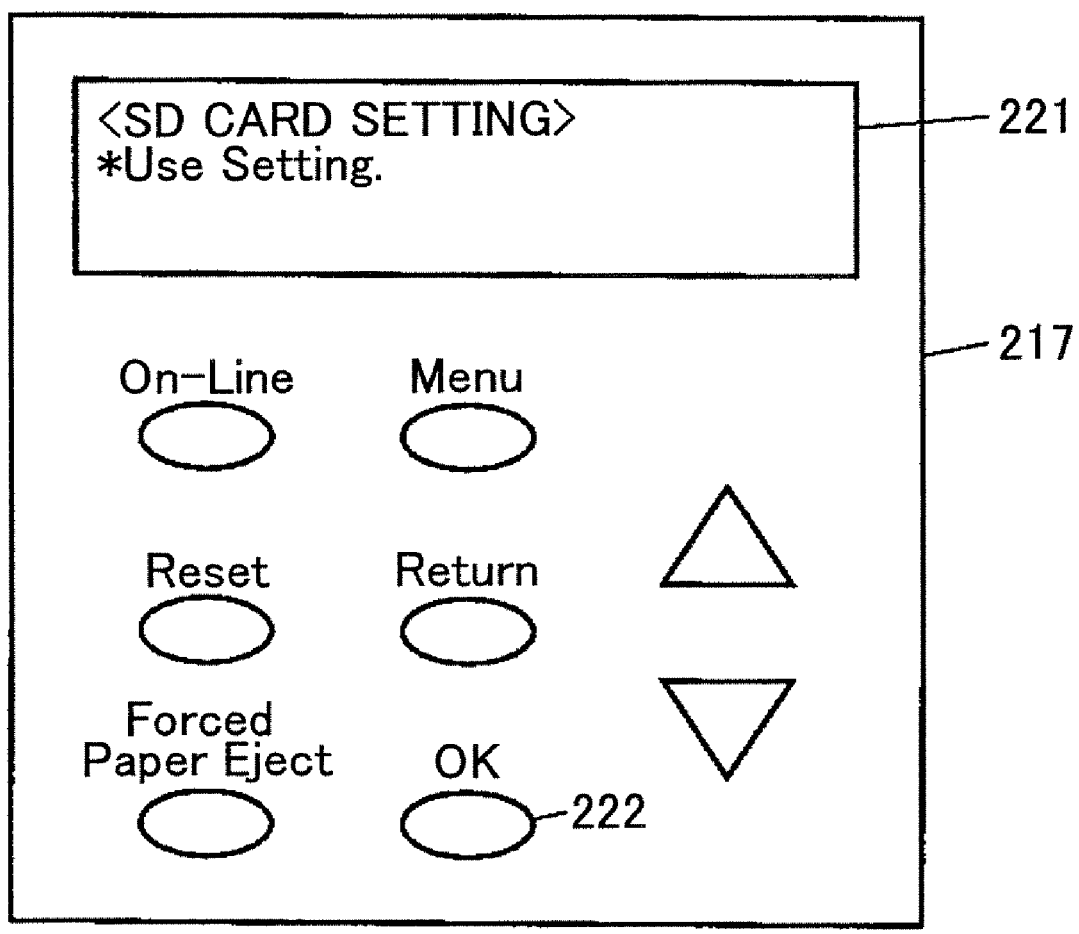
FIG. 15 is a diagram showing a displayed screen on which the settings related to the SD memory card are made in the printer shown in FIG. 6.

FIG. 15 is a diagram showing a displayed screen on which the settings related to the SD memory card are made in the printer shown in FIG. 6. In addition, FIG. 16 is a diagram showing a transition of the displayed screen in the setting mode, using the screen for accepting the settings related to the use of the SD memory card as a reference.

Figure 16:
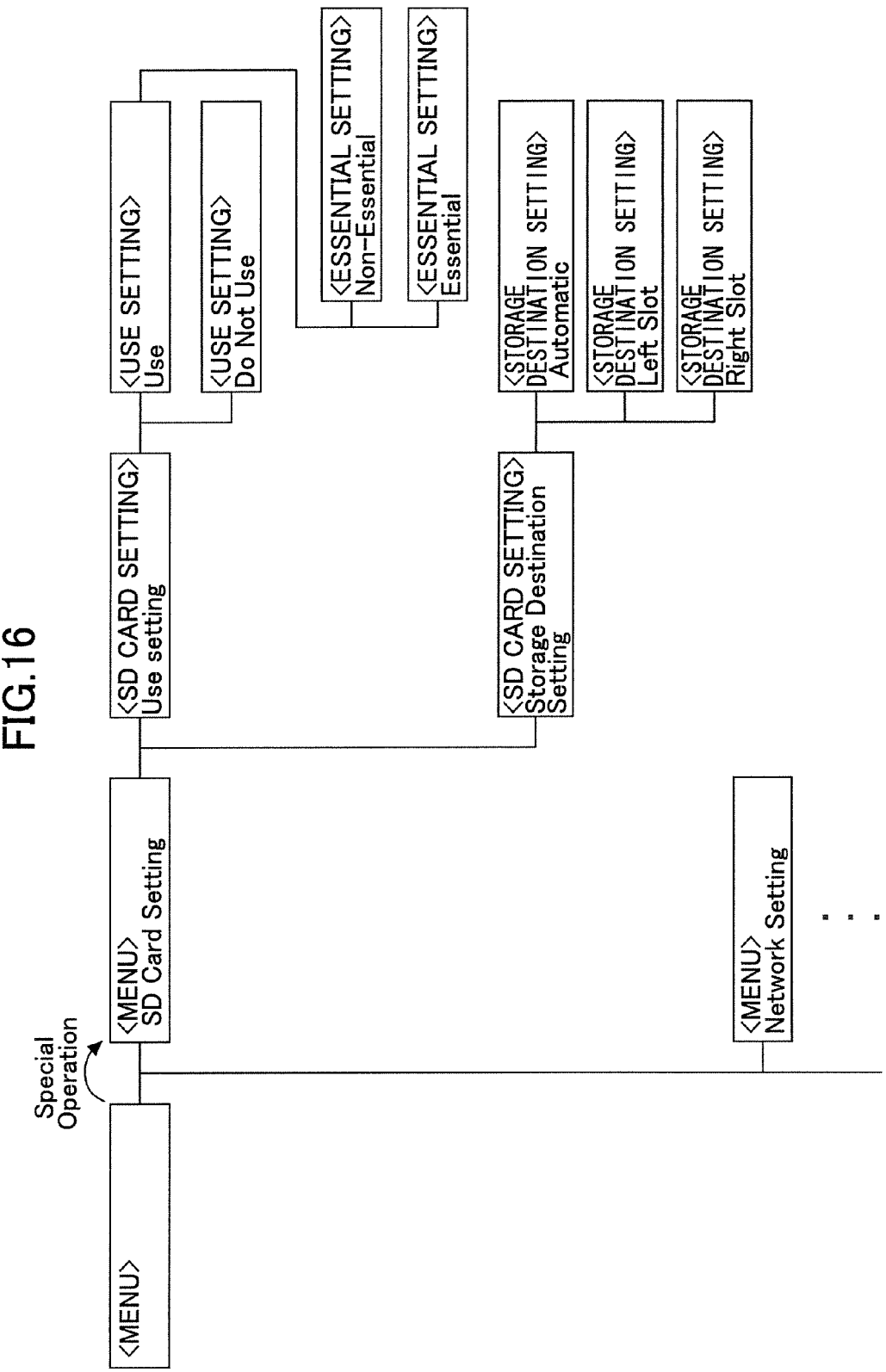
FIG. 16 is a diagram showing a transition of the displayed screen in a setting mode, using the screen for accepting the settings related to the use of the SD memory card as a reference.

As may be seen from FIGS. 15 and 16, when the user makes the special operation on the setting screen, the screen switches to the setting screen for making the settings related to the use of the SD memory card, and it is possible to make appropriate selecting instructions on a screen in the lower hierarchical level. Such selecting instructions can set whether or not to use the SD memory card 140 when operating the printer 120 in the "SD Card Use Setting" item, whether or not the SD memory card 140 is essential (or non-essential) in the "SD Card Essential Setting" item, and "automatic" or "left slot" or "right slot" as the slot to which the SD memory card 140 from which the setting information is to be read and to which the setting information is to be written is connected in the "Storage Destination Slot" item.

Returning now to the description of FIG. 14, the illustration and detailed description of the process of accepting the above described setting operation will be omitted. But when a step S83 detects the operation to end the setting screen, the process advances to a step S84. The step S84 decides whether or not a change in the settings related to the use of the SD memory card has been made on the setting screen. If the decision result in the step S84 is YES, a step S85 stores the setting information related to the use of the SD memory card in the internal storage part 123. In addition, a step S86 sets the printer 120 to the on-line state, a step S87 ends the setting mode, and the process ends.

On the other hand, if the decision result in the step S84 is NO, the process advances to the step S86.

The setting information of the settings related to the use of the SD memory card is stored only in the printer 120 and not in the SD memory card 140. Hence, no writing is made to the SD memory card 140 in this case. This is because, the setting to use or not to use the SD memory card is peculiar to each equipment, and it would be inconvenient if the setting were to be read from the SD memory card and changed. Of course, however, this arrangement is not essential.

According to the process shown in FIG. 14, the changing of the settings related to the use of the SD memory card, particularly the "SD Card Use Setting" and the "SD Card Essential Setting", is accepted not in the normal setting mode but in the exclusive setting mode the use of which is only permitted to the authenticated user who is successfully authenticated by the exclusive authentication process. For this reason, it is possible to prevent the important settings related to the basis of the operation of the apparatus from being changed by the general user, and thereby prevent the system stability from deteriorating due to unexpected setting changes made by the general user.

In addition, the special setting mode for making the settings related to the use of the SD memory card is distinguished from the normal setting mode. Hence, the menus of the special setting mode for making the settings related to the use of the SD memory card can be hidden from, that is, not displayed with respect to, the users who do not use the SD memory cards. Therefore, such users who do not use the SD memory cards may use the printer 120 as if the printer 120 were a normal printer that does not have the function of reading the setting information from the SD memory card. The usage of the printer 120 is also increased from this point of view, and the cost of the entire printing system 100 can be reduced by the effects of mass production of the printers 120.

Figure 17A:
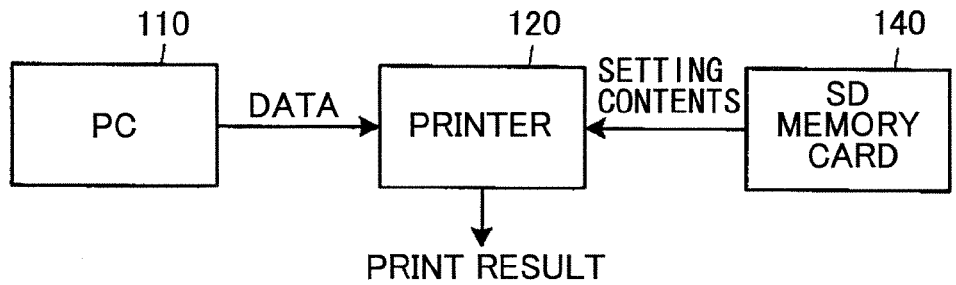
FIGS. 17A and 17B are diagrams for explaining characterizing features of the printing system of the second embodiment of the present invention.
Figure 17B:
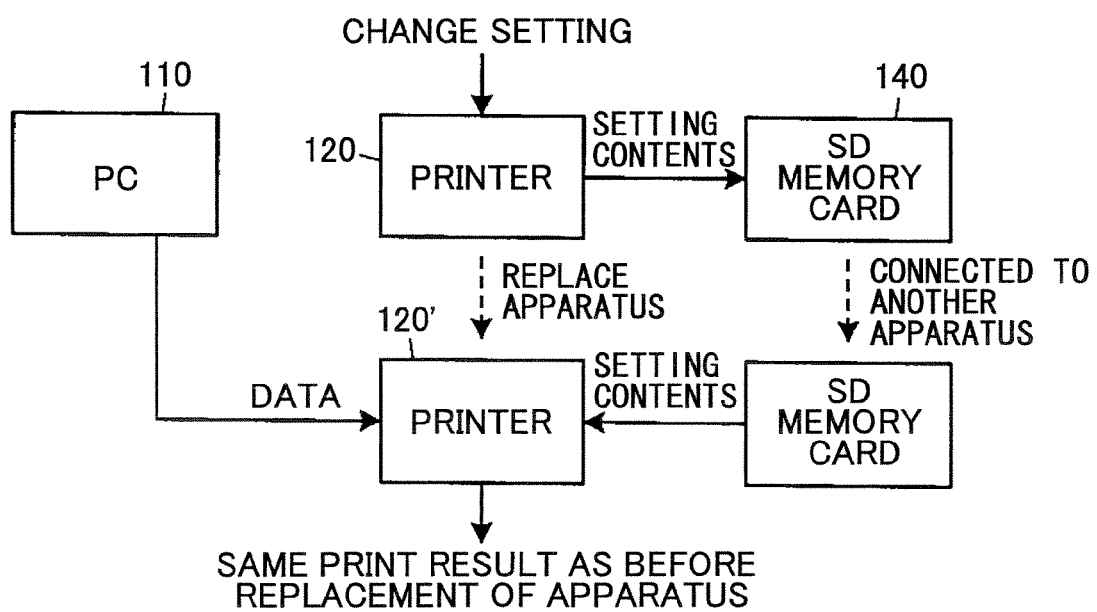

Next, a description will be given of the characterizing features of the printing system 100 described above, by referring to FIGS. 17A and 17B. FIGS. 17A and 17B are diagrams for explaining the characterizing features of the printing system 100 of the second embodiment of the present invention.

In the printer 120 described above, if the setting is made to use the SD memory card, it is possible to make the printer 120 read the setting information recorded in the SD memory card 140 by the function of the setting managing part 122 and to carry out the operation according to the setting information, such as accepting the printer request from the PC 110 and carrying out the print operation according to the print request, as shown in FIG. 17A.

Accordingly, if the SD memory card 140 recorded with the necessary setting information is prepared in advance, the settings necessary for the communication between the printer 120 and the PC 110, such as the IP address, can be made without requiring the user to make a setting operation, and the printer 120 assumes a state where the PC 110 is able to transmit the print request with respect to the printer 120. In addition, the printer 120 assumes a state capable of carrying out the print operation according to the print request.

Furthermore, as shown in FIG. 17B, when the setting information is changed in the printer 120, the contents of the changed setting information can be also be reflected to the SC memory card 140. Hence, even if a failure occurs in the printer 120 and is replaced by a substitute printer 120', the SC memory card 140 may be disconnected from the printer 120 and connected instead to the substitute printer 120', so that the substitute printer 120' may operate similarly to the replaced printer 120 according to the setting information read from the SD memory card 140.

In this case, the PC 110 can send the print request to the remote end having the same IP address, regardless of whether or not the originally intended printer 120 has been replaced by the substitute printer 120', that is, an apparatus that is physically different from the originally intended printer 120.

The other effects of this embodiment are basically the same as those obtainable in the first embodiment described above, and a detailed description thereof will be omitted. According to the printing system 100, when using the printers 120 that accept print requests from a remote end, it is possible to easily build, at a low cost, an environment in which the work of the original printer 120 can quickly be continued by the substitute printer 120' (that is, the substitute equipment) even if a failure occurs in the original printer 120.

In the case of the printer, the user must go to the printer and fetch the output result (that is, the printed paper or print-out) that is responsive to the operation request. Hence, if a failure occurs in the printer and is replaced by the substitute printer that is set up at a location different from the location of the original printer, the user must go to a different location to fetch the output result, that is, a moving path or pattern of the user must be changed. Confusion may be generated in the work if such a change of the moving path or pattern of the user occurs. Accordingly, when a failure occurs in the apparatus, there are demands to continue the work by quickly replacing the original apparatus by a substitute apparatus without changing the physical location of the substitute apparatus from the location of the original apparatus, and this embodiment is particularly effective when applied to such apparatuses.

Modifications of the Embodiments

In one modification of the first embodiment described above, the communication apparatus 10 and the operation request accepting apparatus 20 may be integrally provided within a single apparatus. The present invention is also applicable to such a single apparatus in which the transmission of the operation request takes place.

In another modification of the first embodiment, the setting information to be initially recorded in the recording medium 30 may be edited on a computer such as a PC before being recorded in the recording medium 30. In this case, when setting up the apparatus, the user can make the settings on an apparatus having a high operability, and it is possible to reduce the burden, of the setting operation, on the user.

In another modification, it is not essential to make the setting information stored in the internal storage part 22 changeable. In other words, it is possible to selectively use one of the fixed setting information of the internal storage part 22 and the setting information read from the recording medium 30, depending on the setting that indicates whether or not to use the recording medium 30.

In the second embodiment described above, when the setting indicates the SD memory card as being essential, the printer 120 is not set to the on-line state if the setting information cannot be read from the SD memory card 140, the printer 120 is not set to the on-line state if the setting information cannot be written to the SD memory card 140, and the setting information is not written to the internal storage part 123 if the setting information cannot be written to the SD memory card 123. But in one modification of the second embodiment, independent items may be provided so that it is possible to independently set whether or not to execute each of such operations.

In another modification of the second embodiment, the setting information that is read from the SD memory card 140 is only the setting information related to communication. In this case, the setting information read from the SD memory card 140 is set in the internal storage part 123, and this setting information may be used to communicate with an external setting server or other network apparatuses so as to acquire the setting information other than the setting information related to the communication.

In still another modification of the second embodiment, the items of the setting information shown in the Table 2 are recorded in the SD memory card 140, and the printer 120 may be made to read the items of the setting information from the SD memory card 140 and to set the items of the setting information therein.

Of course, it is possible to appropriately combine two or more embodiments and modifications described above within a limit that avoids contradictions.

A computer-readable program according to the present invention causes a computer to carry out the processes described above. More particularly, the computer-readable program causes the computer to control an apparatus that accepts an operation request from a remote end, and to function as an apparatus such as the operation request accepting apparatus 20. The effects of the embodiments described above can be obtained by causing the computer to operate in this manner by the computer-readable program.

A computer-readable storage medium according to the present invention stores the computer-readable program described above. The computer-readable storage medium may be formed by any recording media capable of storing the computer-readable program in a computer-readable manner.

The computer-readable program may be prestored in a storage part or means within the computer, such as the ROM and the HDD. On the other hand, the computer-readable program may be stored in a non-volatile recording medium or memory, such as a CD-ROM, flexible disk, an SRAM, an EEPROM, a memory card, a magnetic recording medium, an optical recording medium and a magneto-optical recording medium. The computer-readable program stored in the non-volatile recording medium or memory may be installed into the computer and executed by the CPU or, the CPU may read the computer-readable program from the non-volatile recording medium or memory and execute the computer-readable program, so as to realize the functions of any of the embodiments and modifications described above.

Of course, the computer-readable program may be executed by downloading the computer-readable program from an external equipment that is provided with a recording medium recorded with the computer-readable program or, from an external equipment having a storage part or means stored with the computer-readable program.

Therefore, according to the operation request accepting apparatus, the computer-readable program, the computer-readable storage medium, the control method for operation request accepting apparatus, the communication system, and the operating method for communication system according to the present invention, it is possible to build, at a low cost, an environment that enables a substitute equipment to quickly continue the work even when a failure is generated in an operation request accepting apparatus which accepts an operation request from a remote end. The substitute equipment may have functions comparable to or, the same as those of the operation request accepting apparatus. Hence, it is possible to reduce the down-time of the apparatus at a low cost.

This application claims the benefit of a Japanese Patent Application No. 2005-187858 filed Jun. 28, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. An operation request accepting apparatus comprising:
a reading part configured to read, from a recording medium that is detachably coupled to the reading part, setting information that is used by the operation request accepting apparatus in order to perform a function in response to an operation request that is sent from a remote end with respect to the operation request accepting apparatus; and
an accepting part having an essential setting that prohibits the operation request accepting apparatus from accepting the operation request from the remote end in order to prohibit the function from being performed if the setting information is non-readable by the reading part from the recording medium.

2. The operation request accepting apparatus as claimed in claim 1, further comprising:
a storage part configured to store the setting information; and
a writing part, coupled to the reading part and the storage part, configured to write the setting information in the recording medium and in the storage part,
wherein a setting is provided to disable writing to the storage part by the writing part if writing to the recording medium is impossible.

3. The operation request accepting apparatus as claimed in claim 1, further comprising:
a storage part configured to store the setting information; and
a writing part, coupled to the reading part and the storage part, configured to write the setting information in the recording medium and in the storage part,
wherein the accepting part has a setting that prohibits the operation request accepting apparatus from accepting the operation request from the remote end if the writing part cannot write to the recording medium.

4. The operation request accepting apparatus as claimed in claim 1, wherein the setting information includes, in addition to information that is used by the operation request accepting apparatus when the remote end sends the operation request with respect to the operation request accepting apparatus, information that is used by the operation request accepting apparatus when executing the operation request accepted from the remote end.

5. The operation request accepting apparatus as claimed in claim 1, further comprising:
a user interface configured to accept a write instruction to write the setting information to the recording medium; and
an authenticating part configured to make an exclusive authentication for judging whether or not to enable or disable changing of the essential setting depending on an operation content of the user interface.

6. The operation request accepting apparatus as claimed in claim 1, wherein the setting information includes information of an Internet Protocol (IP) address of the operation request accepting apparatus.

7. The operation request accepting apparatus as claimed in claim 1, further comprising:
an image forming part configured to form an image on paper in response to the operation request from the remote end, based on the setting information that is read from the recording medium by the reading part,
wherein the operation request accepting apparatus performs a printer function.

8. The operation request accepting apparatus as claimed in claim 7, wherein the setting information includes one of form data, font data, tray information, emulation information, and paper kind information or data indicating the kind of paper, used by the printer function when forming the image on the paper.

9. A computer-readable storage medium on which a computer-readable program with computer-executable instructions which, when executed by a computer, causes the computer to perform a process of accepting an operation request from a remote end, is stored, said program comprising:
a reading procedure causing the computer to read, from a recording medium that is detachably coupled to the computer, setting information that is used by the computer in order to perform a function in response to the operation request that is sent from a remote end with respect to the computer; and
an accepting procedure causing the computer to make an essential setting that prohibits the computer from accepting the operation request from the remote end in order to prohibit the function from being performed if the setting information is non-readable from the recording medium by said reading procedure.

10. The computer-readable storage medium as claimed in claim 9, wherein said program further comprises:
- a writing procedure causing the computer to write the setting information in the recording medium and in a storage part that is coupled to the computer; and
- a procedure causing the computer to make a setting to disable writing to the storage part by the writing procedure if writing to the recording medium is impossible.

11. The computer-readable storage medium as claimed in claim 9, wherein said program further comprises:
- a writing procedure causing the computer to write the setting information in the recording medium and in a storage part that is coupled to the computer,
- wherein the accepting procedure causes the computer to make a setting that prohibits the computer from accepting the operation request from the remote end if the writing procedure cannot cause the computer to write to the recording medium.

12. The computer-readable storage medium as claimed in claim 9, wherein the setting information includes, in addition to information that is used by the computer when the remote end sends the operation request with respect to the computer, information that is used by the computer when executing the operation request accepted from the remote end.

13. The computer-readable storage medium as claimed in claim 9, wherein said program further comprises:
- an authenticating procedure causing the computer to make an exclusive authentication for judging whether or not to enable or disable changing of the essential setting depending on an operation content of a user interface that is coupled to the computer and accepts a write instruction to write the setting information to the recording medium.

14. The computer-readable storage medium as claimed in claim 9, wherein the setting information includes information of an Internet Protocol (IP) address of the computer.

15. The computer-readable storage medium as claimed in claim 9, wherein the computer controls an operation request accepting apparatus configured to accept the operation request from the remote end, and the recording medium is detachably coupled to the operation request accepting apparatus.

16. The computer-readable storage medium as claimed in claim 9, wherein said program further comprises:
- an image forming procedure causing the computer to form an image on paper in response to the operation request from the remote end, based on the setting information that is read from the recording medium by the reading procedure,
- wherein the computer performs a printer function by the image forming procedure.

17. The computer-readable storage medium as claimed in claim 16, wherein the setting information includes one of form data, font data, tray information, emulation information, and paper kind information or data indicating the kind of paper, used by the printer function of the computer when forming the image on the paper.

18. A control method for an operation request accepting apparatus which accepts an operation request from a remote end, comprising:
- reading, from a detachable recording medium, setting information that is used by the operation request accepting apparatus in order to perform a function in response to the operation request that is sent from a remote end with respect to the operation request accepting apparatus; and
- making an essential setting that prohibits the operation request accepting apparatus from accepting the operation request from the remote end in order to prohibit the function from being performed if the setting information is non-readable from the recording medium by said reading.

19. A communication system comprising:
- an operation request accepting apparatus; and
- a communication apparatus configured to send an operation request with respect to the operation request accepting apparatus,
- wherein the operation request accepting apparatus comprises:
  - a reading part configured to read, from a recording medium that is detachably coupled to the operation request accepting apparatus, setting information that is used by the operation request accepting apparatus in order to perform a function in response to the operation request that is sent from the communication apparatus with respect to the operation request accepting apparatus; and
  - an accepting part having an essential setting that prohibits the operation request accepting apparatus from accepting the operation request from the communication apparatus in order to prohibit the function from being performed if the setting information is non-readable from the recording medium by the reading part.

20. An operating method for a communication system having an operation request accepting apparatus and a communication apparatus configured to send an operation request with respect to the operation request accepting apparatus,
- wherein the operation request accepting apparatus comprises a reading part configured to read, from a recording medium that is detachably coupled to the reading part, setting information that is used by the operation request accepting apparatus in order to perform a function in response to the operation request that is sent from the communication apparatus with respect to the operation request accepting apparatus, and an accepting part having an essential setting that prohibits the operation request accepting apparatus from accepting the operation request from the communication apparatus in order to prohibit the function from being performed if the setting information is non-readable from the recording medium by the reading part, said operating method comprising:
- making the essential setting in the operation request accepting apparatus that is to be set to a state communicatable with the communication apparatus;
- coupling to the operation request accepting apparatus the detachable recording medium that is recorded with the setting information;
- preparing a substitute apparatus having comparable functions as the operation request accepting apparatus and having the essential setting; and
- replacing the operation request accepting apparatus by the substitute apparatus if a failure occurs in the operation request accepting apparatus, coupling the recording medium to the substitute apparatus by removing the recording medium from the operation request accepting apparatus, and setting the substitute apparatus to a state communicatable with the communication apparatus.

* * * * *